US012602962B2

(12) United States Patent
Yunke et al.

(10) Patent No.: US 12,602,962 B2
(45) Date of Patent: Apr. 14, 2026

(54) CONTACTLESS OPTICAL INTERNET OF THINGS USER IDENTIFICATION DEVICE AND SYSTEM

(71) Applicant: U.S. Bank National Association, Minneapolis, MN (US)

(72) Inventors: Justin P Yunke, Shakopee, MN (US); Adam J. Achterhoff, Savage, MN (US)

(73) Assignee: U.S. Bank National Association, Minneapolis, MN (US)

( * ) Notice: Subject to any disclaimer, the term of this patent is extended or adjusted under 35 U.S.C. 154(b) by 540 days.

(21) Appl. No.: 17/407,997

(22) Filed: Aug. 20, 2021

(65) Prior Publication Data
US 2023/0054831 A1 Feb. 23, 2023

(51) Int. Cl.
| | |
|---|---|
| *G07C 9/22* | (2020.01) |
| *G06F 9/4401* | (2018.01) |
| *G06F 21/60* | (2013.01) |
| *G06K 7/14* | (2006.01) |

(52) U.S. Cl.
CPC ............. *G07C 9/22* (2020.01); *G06F 9/4401* (2013.01); *G06F 21/606* (2013.01); *G06K 7/1413* (2013.01); *G06K 7/1417* (2013.01)

(58) Field of Classification Search
CPC ....... G07C 9/22; G06F 9/4401; G06F 21/606; G06K 7/1413; G06K 7/1417
See application file for complete search history.

(56) References Cited

U.S. PATENT DOCUMENTS

| | | | | | |
|---|---|---|---|---|---|
| 4,720,812 | A | * | 1/1988 | Kao ...................... | G06F 9/4403 |
| | | | | | 713/2 |
| 8,037,208 | B2 | * | 10/2011 | Creemer ................... | G06F 8/60 |
| | | | | | 709/248 |
| 9,984,520 | B1 | * | 5/2018 | Heller ...................... | H04W 4/80 |
| 2017/0257358 | A1 | * | 9/2017 | Ebrahimi ............... | H04L 9/3236 |
| 2021/0194681 | A1 | * | 6/2021 | Nix ...................... | H04L 63/0823 |
| 2023/0032735 | A1 | * | 2/2023 | Friend ...................... | F24F 11/63 |

FOREIGN PATENT DOCUMENTS

| | | | | | |
|---|---|---|---|---|---|
| CA | 2605602 | * | 11/2006 | .............. | G06F 11/36 |
| CA | 3110641 | * | 10/2019 | .............. | H04L 9/08 |

OTHER PUBLICATIONS

English Translation of WO 2019023864 (Year: 2019).*

* cited by examiner

*Primary Examiner* — Patrick N Edouard
*Assistant Examiner* — Eboni N Giles
(74) *Attorney, Agent, or Firm* — Merchant & Gould P.C.

(57) ABSTRACT

A contactless optical device is useable to identify a user, and allows an enterprise to authorize access by that user to enterprise facilities and/or cause presentation of user information of the user. The device is specifically adapted for secure usage within an enterprise network via a wired network interface. The device avoids storage of user-identifying data in persistent memory, to avoid compromise of user data if the device were lost or stolen, or otherwise removed from the enterprise network.

19 Claims, 20 Drawing Sheets

Network
501

Processor(s) 502

Network Interface
Unit 504

Input/ Output
Unit 506

522

System Memory 508

Random
Access
Memory
510

Read Only
Memory
512

Mass Storage Device
514

Software
Applications
516

Operating
System
518

Role-Specific
Database 515

Computing System 500

| HW ID | IP Address | Keys | Control Prog |
|-------|-------------|-------|--------------|
| 1234 | 101.101.101.101 | ABCDE | Access |
| 5678 | 202.202.202.202 | WXYZ | Check-In |
| 9876 | 303.303.303.303 | LMNOP | Access |
| ... | ... | ... | ... |

| User | Role | Device(s) Auth. | Code |
|---|---|---|---|
| U1 | Guest | Check in Devices | A1B2 |
| U2 | Empl. | Check in Devices (Admin)<br>Access Devices (User) | C3D4 |
| U3 | Admin | All Devices (Admin) | E5F6 |
| U4 | Guest | Check in Devices | G7H8 |
| ... | ... | ... | ... |

700

Plug in Device/ Power On <u>802</u>

Startup/Bootstrap; Load Control Program <u>804</u>

Admin User Validation <u>806</u>

Scan Optical Code <u>808</u>

Translate Code <u>810</u>

Validate Code, Take Action <u>812</u>

800

900

1100

CONTACTLESS OPTICAL INTERNET OF THINGS USER IDENTIFICATION DEVICE AND SYSTEM

BACKGROUND

Internet of things devices have a wide variety of use cases, and take a wide variety of forms. In one example implementation, an Internet of things device may obtain images of identifying information, such as a barcode or QR code, which in turn may be used to access specific information in response to the data encoded within the barcode or QR code. For example, QR codes may be used to embed hyperlink information to documents, and barcodes are commonly used in point-of-sale systems to identify sold items and initiate sales transactions with respect to those items, as well as to associate a user with a particular loyalty or rewards program at a retailer.

Additionally, other types of Internet of things devices may be used to provide access to data or facilities. For example smartcards are often used in conjunction with smart card readers to provide access to a facility, or to embed user identifying information which may in turn be used by that user to access account information of various forms. An advantage of smart cards is that such cards have an ability to negotiate a secure connection at the time of communication between the smart card and smart card reader. However, existing smart card readers include a proximity reader interface, as well as a controller that determines whether access to a facility, or to data, is allowed. Such a proximity reader typically requires use of a previously-issued smart card by users, and therefore is not flexible to allow one-time visitors or convenient additions to user access rights. However, smart card readers do have the advantage of generally being considered secure, since the communication between a smart card and smart card reader is generally encrypted and may use a special communication protocol. Furthermore, individuals often carry their personal mobile devices, such as a smartphone, but may not carry a wallet or purse; as such, it is more likely that a user will carry his/her mobile device than may carry a smart card.

Additionally, smart card readers are often fixedly mounted at a particular location (e.g., adjacent to a door) and are integrated with door locks or other types of security equipment, and cannot readily be repurposed for use with other doors, or in other applications beyond security.

Optical readers have typically not been in widespread use for user identification applications, such as access applications where security is important. Often, optical readers will capture images of optical labels (also referred to herein as optical codes) and transmit those images remotely. Images are easily modified or intercepted, and often require significant bandwidth due to their relative size. Still further, in some instances image capture is not desirable, since it may be perceived that an imaging device is capturing an image of individuals, rather than of a code. Furthermore, it is often the case that access control information is stored on the scanning device itself, and therefore the device itself is a security risk if it is stolen or removed.

In the context of smart card readers, an administrative user typically must specify particular readers that are used to allow access to a facility. In general, for security and audit reasons, no individual reader can be specified to allow access from any valid card. While mass provisioning to allow multiple user cards to have authorized access at a given reader, such access may also be problematic.

SUMMARY

In general, the present application is directed to a contactless optical device that is useable to identify a user, thereby allowing an enterprise to authorize access by that user to enterprise facilities and/or cause presentation of user information of the user, e.g., to facilitate assistance to the user or feedback to the user. The device is specifically adapted for secure usage within an enterprise network, and avoids storing user-identifying data or proprietary operating instructions in persistent memory, to avoid compromise of user data or enterprise code if the device were lost or stolen, or otherwise removed from the enterprise network.

In a first aspect, a contactless optical user identification device is disclosed. The device includes an optical code capture device comprising an optical image capture device and an optical code translation circuit, the optical code translation circuit configured to recognize and translate a machine-readable optical label captured in an image by the optical image capture device into a binary code. The device further includes a wired network access interface communicatively connected to the control circuit and providing both a wired network access connection and power connection for the contactless optical user identification device. The device further includes a control circuit communicatively connected to the optical code capture device, the control circuit including a processor and a memory. The memory includes a non-volatile memory storing a general purpose operating environment and bootstrap instructions and a volatile memory configured to receive special-purpose operating instructions from a bootstrap server identified in the bootstrap instructions in response to execution of the bootstrap instruction. The special-purpose operating instructions cause the device to: in response to capture of an image of the machine-readable optical label presented by a user and translation of the machine-readable optical label into a binary code: securely transmit the translated binary code to an identification server; and receive, in response to the translated binary code, an indication of a result of identification of the user from the identification server.

In a second aspect, a method includes, in response to execution of a bootstrap instruction from nonvolatile memory, downloading special-purpose operating instructions from a bootstrap server identified by the bootstrap instruction into volatile memory of a contactless optical user identification device, the bootstrap server being positioned within an enterprise network. The method further includes capturing, at the contactless optical user identification device, an image of a machine-readable optical label presented by a user, and translating the image of the machine-readable optical label into a translated binary code. The method also includes securely transmitting the translated binary code from the contactless optical user identification to an identification server via the enterprise network. Based on a response from the identification server, the method includes providing feedback to the user regarding a result of identification of the translated binary code.

In a third aspect, an access management system includes one or more enterprise servers and a contactless optical user identification device communicatively coupled to the one or more enterprise servers via an enterprise network. The contactless optical user identification device is installed at an access portal within an enterprise and includes an optical code capture device comprising an optical image capture device and an optical code translation circuit, the optical code translation circuit configured to recognize and translate a machine-readable optical label captured in an image by the optical image capture device into a binary code. The device further includes a wired network access interface communicatively connected to the control circuit and providing a wired network access connection to the one or more enterprise servers, and a control circuit communicatively connected to the optical code capture device. The control circuit includes a processor and a memory. The memory includes a non-volatile memory storing a general purpose operating environment and bootstrap instructions and a volatile memory configured to receive special-purpose operating instructions from a bootstrap server identified in the bootstrap instructions in response to execution of the bootstrap instruction. The special-purpose operating instructions cause the device to, in response to capture of an image of the machine-readable optical label presented by a user and translation of the machine-readable optical label into a binary code, securely transmit the translated binary code to an identification server. The one or more enterprise servers communicates a result of identification of the user based on the translated binary code to authorize access by the user at the access portal.

BRIEF DESCRIPTION OF THE DRAWINGS

FIG. 18 is a further table illustrating user roles in communication with the contactless optical user identification device described herein, as may be managed using an enterprise server system.

DETAILED DESCRIPTION

Figure 1:
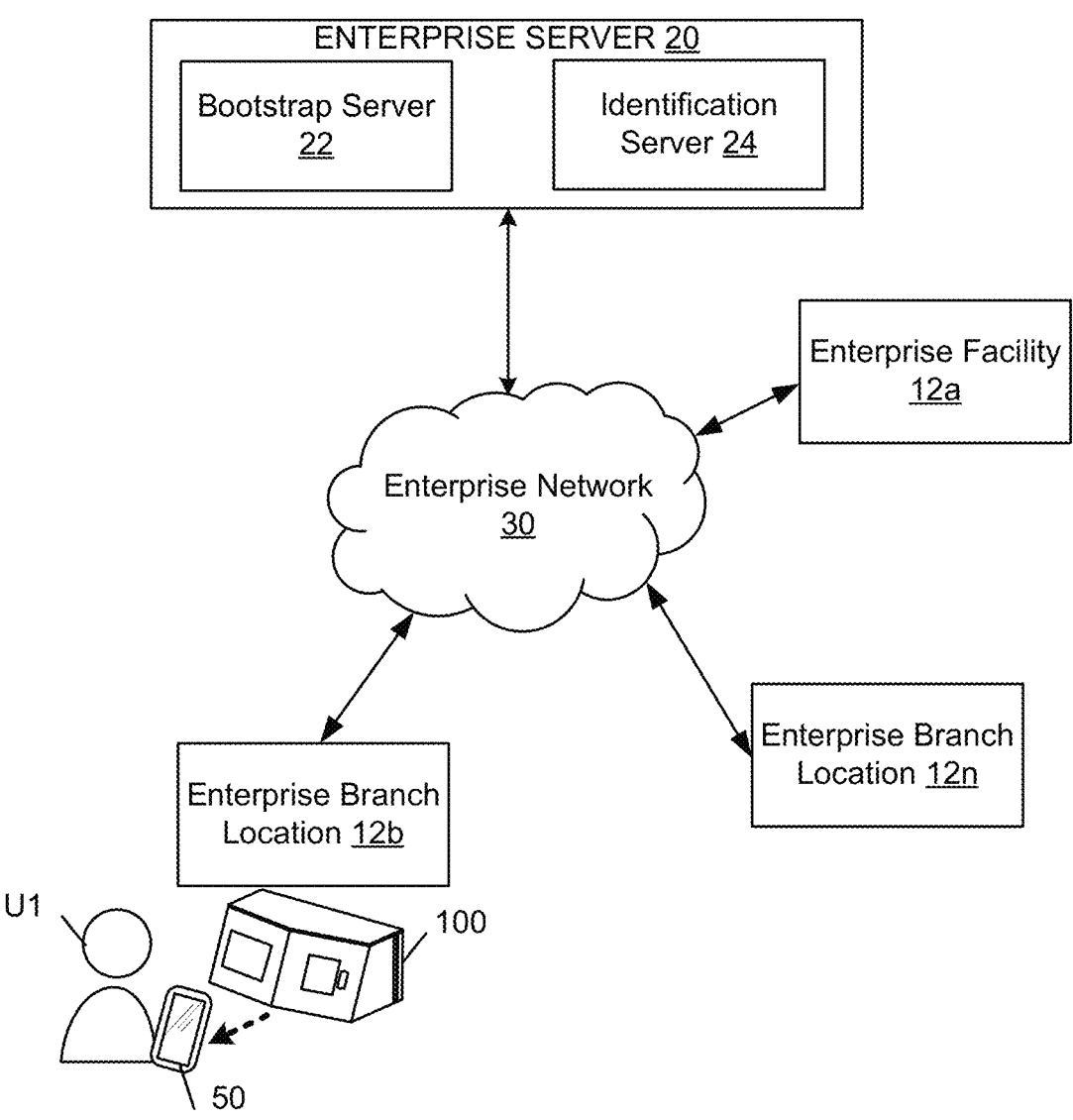
FIG. 1 illustrates an example environment in which the contactless optical user identification device may be used.

As briefly described above, embodiments of the present invention are directed to a contactless optical user identification device. In certain embodiments, an optical reader may be used to capture image data, such as data representing a particular code that may be presented at the optical reader. The optical reader may be included in a device that also includes a display, with the display presenting information regarding the user's access attempt, or may present information to the user or another user based on that user's access attempt.

In some examples, the contactless optical user identification device may be used in conjunction with a mobile application which is configured to manage presentation of an optical code. In examples, the optical code can be a QR code that embeds a particular key. The key may be a rotating key value that is stored in the application and synchronized to a backend identification system. When the optical code is presented at the optical reader, the key value presented by the mobile device and captured at the optical reader may be compared to a synchronized key value maintained at the backend identification system. Accordingly, a strong, key-based security may be provided using an otherwise static QR code.

In some embodiments, a further authentication factor may be used. For example, some additional information (e.g., a prestored secret) known by the user associated with the mobile device may be entered at the user identification device. In a further example, another factor of identification, such as a biometric identification factor (e.g. a fingerprint or face identification) may be used as a second factor of identification.

In examples, users wishing to utilize the device and system described herein may also receive printed or electronically communicated static communications that include an embedded code, such as a QR code. The embedded code may be scanned at the user identification device and used as a one-time passcode for that user, (e.g., to initiate an enrollment process or otherwise provide a one-time access or service to that user). In still further examples, the embedded code may be scanned by a user at home via a mobile device, thereby allowing the user to download a mobile application that provides the rotating key that will in turn be presented as a different embedded code on the user mobile device. In this way, the user does not present to the user identification device a static code, thereby enhancing security for new users.

In some examples, the contactless optical user identification device has a number of features that improve its security and convenience of use. Specifically, in some instances, the device may be configured with a generic operating system and a bootstrap instruction such that, prior to being provided power or being powered on, the device may lack any operational instructions that would allow the device to operate as an access device. That is, in some instances, when powered on, the device can execute the bootstrap instruction to connect and identify itself to a server. Based on the device being connected to a trusted network (e.g., within an enterprise network) and identified by server, the device may be provided with instructions from the server that are executed solely from volatile memory. The instructions may cause the device to operate as an access device or presentation device. In this way, the device may become an access device when communicatively connected within an enterprise network and appropriately identified by a server, but would not be effective if removed from enterprise premises, nor would it store any sensitive data once disconnected from power over the enterprise network.

In some examples, the contactless optical user identification device is connected to an enterprise network via a wired network connection. In such examples, the device may be connected and may use a Power over Ethernet (PoE) electrical connection to receive power via the same connection as the wired network connection. Accordingly, disconnection of the wired enterprise network connection also disconnects power and causes the execution instructions that allow the device to operate as an access device to be erased from memory.

In further examples, the contactless optical user identification device may be used in varying contexts. For example, the device may be used as an access device, such as to allow access to a particular room based on identification or identification of a user. Still further, the device may be used as a welcome device, allowing a user to check in at the device, and as a device present a welcome message to the user and transmit the user identity to a third party (e.g., an administrative user) who may then view additional information about the identified user.

I. Example Environment

Referring first to FIGS. 1-4, an example environment 10, and installation within such an environment, is illustrated. The example environment 10 represents a possible application in which the contactless optical user identification device may be used. As illustrated, the environment 10 is included within an enterprise, for example implemented across one or more enterprise locations 12a-n. In some implementations, the enterprise locations can include a corporate location at which it may be desirable to grant access to particular locations to enterprise employee users, as well as one or more customer-facing locations at which access may be granted to customer users, and presentation information may be provided to both those customer users and employee users.

In the example seen in FIG. 1, the example environment may be implemented within a financial institution, and may include one or more enterprise facilities 12a at which enterprise employees may require access to specific locations within the facility, as well as a plurality of branch locations 12b-n which may be accessed by either enterprise employees or customers (collectively, "locations" 12).

In the example shown, each of the branch locations 12b-n and other enterprise facilities 12a may be communicatively connected to each other, as well as to an enterprise server 20, via an enterprise network 30. A contactless optical user identification device 100 may be located at one or more of the locations 12. As discussed further below, the contactless optical user identification device 100 may be configurable, at the time of its installation at a location 12, to operate as an access device or a presentation device. Specifically, the contactless optical user identification device 100 may identify a user (e.g., user U1) who presents a machine-readable optical label, such as an optical code (e.g., a QR code), and may grant access to a location within an enterprise facility, (e.g. at one or more of the locations 12). For example, based on identification of a user as an employee, access may be granted to a portion of an enterprise facility that holds employee-specific equipment. Additionally, the contactless optical user identification device 100 may identify a user and present information about that user to an employee at a particular location to facilitate a transaction by the user. For example, a customer user who visits a branch location 12b-n may present an optical code, (e.g., as printed on a piece of paper or presented in a mobile application of a mobile device 50), which identifies the user. The code may be a one-time use code, or a rolling code (if reusable, to enhance security). Based on identification of the user, user details may be presented to a bank branch employee, such as a teller. The user details may include the username, account information, and optionally a probable reason for the visit by the user (e.g. to conduct a financial transaction, to consult with a mortgage banker, etc.).

In the example shown, the enterprise server 20 includes a bootstrap server 22 and an identification server 24. Preferentially, the enterprise server 20 is accessible only to contactless optical user identification devices 100 that are electrically connected within the enterprise network 30. The bootstrap server 22 may store instructions that allow that server to interact with contactless optical user identification devices 100 and provide specific instructions to those devices that define operation of the devices. For example, in some implementations, the contactless optical user identification devices 100 are initialized with only a set of general-purpose instructions and a bootstrap instruction which identifies and provides instructions for connection to the bootstrap server 22. Based on devices 100 being located within the enterprise network 30, the devices 100 may communicatively connect to the bootstrap server 22 and provide a unique identification of that device 100 to the bootstrap server 22. At the bootstrap server 22, a particular role for each known device 100 may be designated (e.g. in a database table as described below), and the bootstrap server may than provide operational instructions to the device 100 that allow the device 100 to act as (e.g., a presentation device, an access device, or some other type of user identification device). As further discussed below, the specific operational instructions that are provided to the device 100 from the bootstrap server 22 may be maintained only in volatile memory of the device 100, such that the device 100 will not persist the operational instructions if unplugged and removed from the enterprise network 30.

This ensures that personal data of particular users cannot be maintained in memory of the device 100 if the device were to be unplugged/removed from an enterprise location 12, and additionally ensure that any proprietary operational instructions are not persisted in similar circumstances.

The identification server 24 may be identifiable via the specific operational instructions provided by the bootstrap server 22. For example, the specific operational instructions may include instructions to, upon capture of an image of an optical code, translate the optical code to a secure binary code which is transmitted to the identification server 24. The instructions may further indicate to the device 100 a specific location (e.g. IP address or server name) of the identification server 24, as well as specific display instructions or communication instructions that may be executed in response to receipt of a resulting message from the identification server 24. For example, the specific display instructions may include instructions to present confirmation of successful receipt of a user identification code, or unsuccessful receipt of such a code. Additionally, in some instances, the specific instructions may indicate to the device 100 to communicate with one or more other devices, for example to send a message to a further server within the enterprise (e.g. to present user information based on a user identity determined by the identification server 24) or a user device (e.g., to communicate a message to a user mobile device 50 that is being used to present the optical code at the device 100).

In some embodiments, the identification server 24 and bootstrap server 22 may be implemented within the same computing device. In alternative embodiments, the identification server 24 and bootstrap server 22 may be implemented within two different computing devices within the enterprise and connected to the enterprise network 30.

Figure 2:
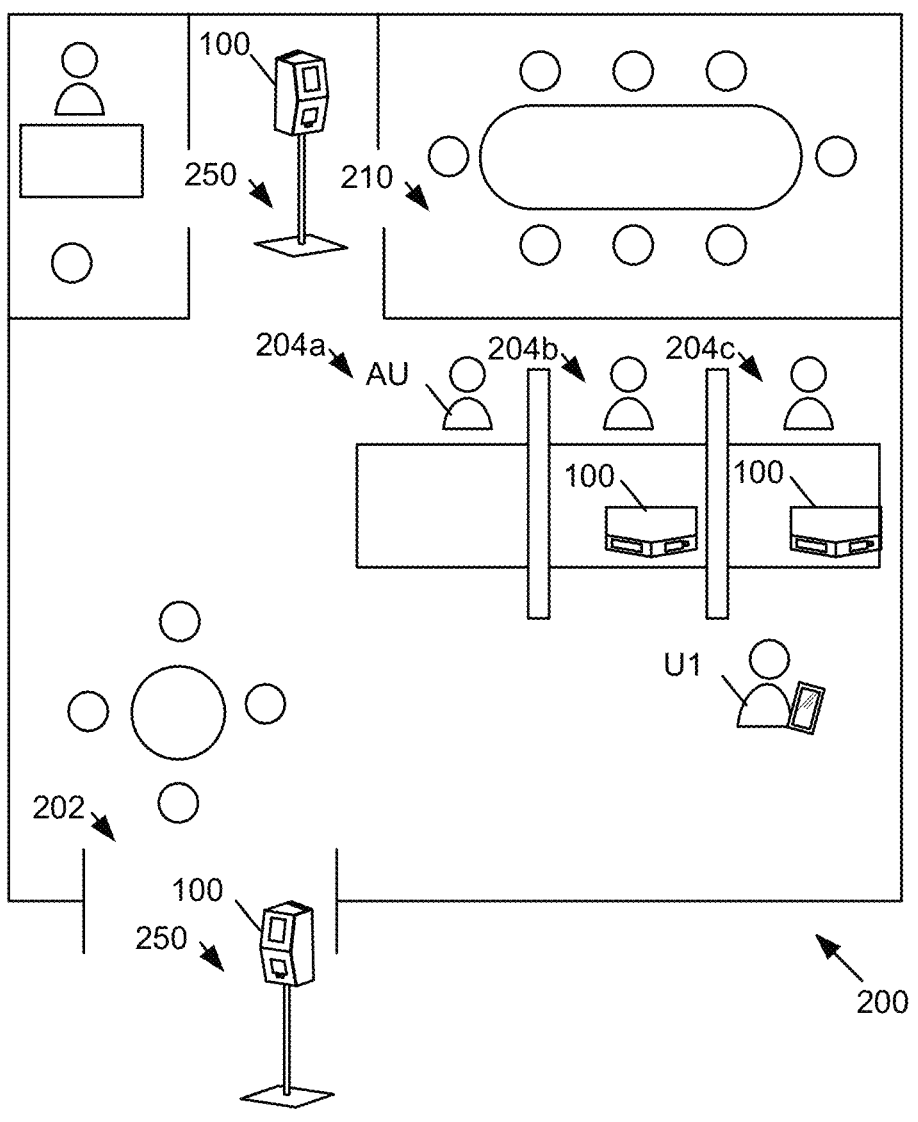
FIG. 2 is a schematic view of an example physical location at which the contactless optical user identification device may be utilized.

FIG. 2 is a schematic view of an example physical location 200 at which the contactless optical user identification device 100 may be utilized. In the example shown, the physical location 200 corresponds to a branch location of a financial institution. Of course, other types of physical locations within an enterprise may utilize a contactless optical user identification device 100, in a manner consistent with the present disclosure.

In the example shown, the location 200 has an entrance area 202 as well as a plurality of interaction areas 204*a-c*. The location 200 further includes a secure physical sub area 210. As illustrated, a contactless optical user identification device 100 may be placed at any of a variety of positions within the location 200, including at the entrance area 202, the interaction areas 204*a-c*, and/or at an entrance of the secure area 210. Each of those devices 100 may receive special programming instructions to operate differently depending on location and desired use.

For example, a device 100 positioned at the entrance area 202 may capture a scan from a customer user U1, and communicate an identification code securely to an identification server 24 as discussed above. The identification server 24 may identify the user U1, and place user information in a queue for servicing by one or more customer service agents at the location 200. Alternatively, a device 100 positioned at one of the interaction areas 204*a-c* may capture an image of an optical code to identify a user, and present user details regarding that user to the specific customer service agent at the particular interaction area, including username, account information, and potential reasons for visit.

Still further, a device 100 positioned at the secure area 210 may capture an image of an optical code to identify a particular user, such as either a customer or an employee user, and selectively allow access to the secure area 210. In examples, an employee user AU may be granted access to the secure area 210, but a customer user U1 will not be granted access to the secure area. Of course, this set of access rights will be defined at the identification server 24 and will be based on the type of secure area for which access is controlled. The grant of access may include, for example, communication from the identification server 24 to the device 100 at secure area, and the device 100 will in turn actuate an access control system (e.g., and electronic lock) to allow access to the secure area 210. Alternately, the grant of access may include communication from the identification server 24 directly to an access control system.

Figure 3:
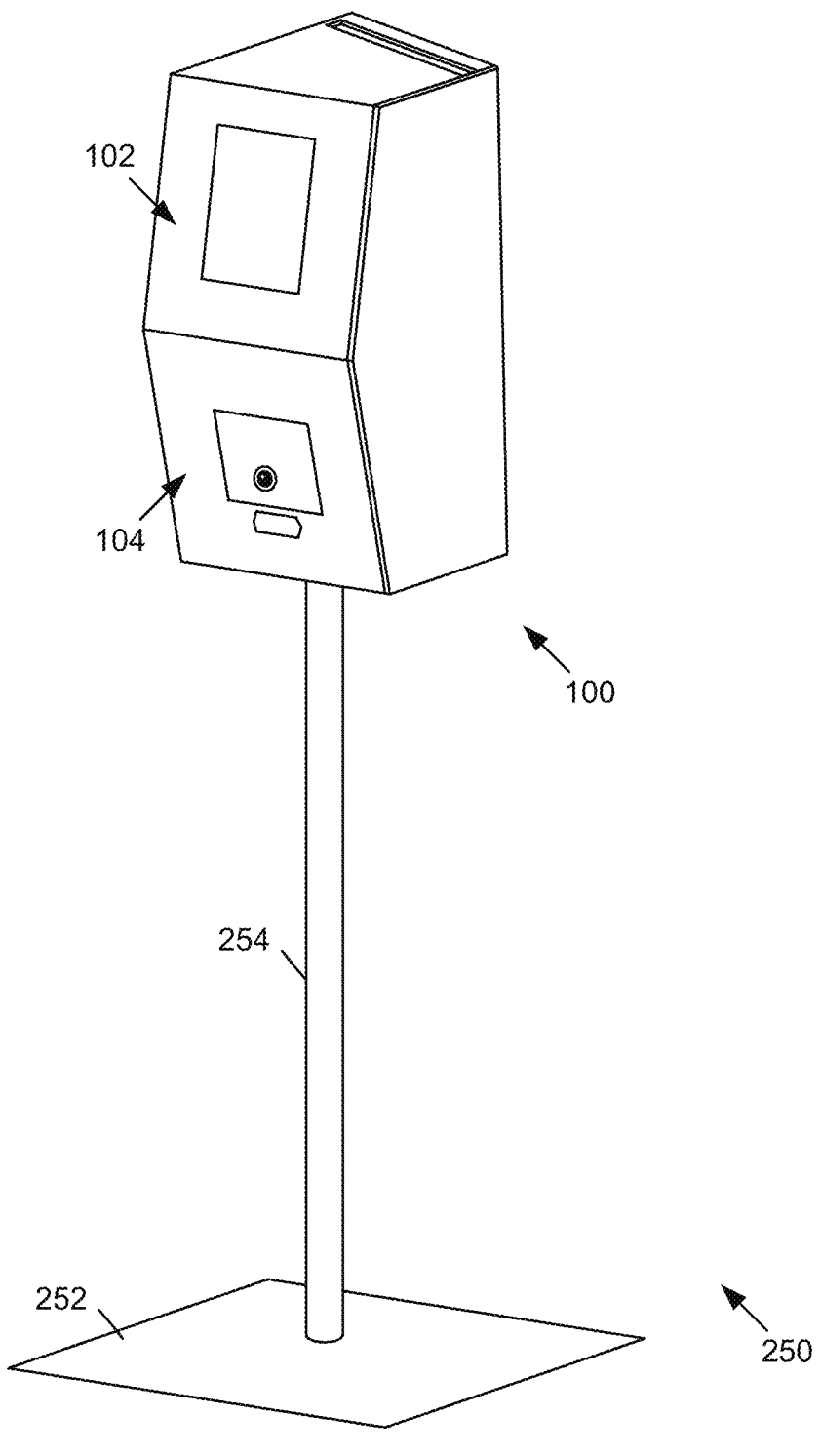
FIG. 3 is a schematic perspective view of an example installation of a contactless optical user identification device, according to an example embodiment.

FIG. 3 is a schematic perspective view of an example installation 250 of a contactless optical user identification device 100 useable at a location 200, according to an example embodiment. The installation 250 includes a base 252 and stand extension 254 which are physically connected to the contactless optical user identification device 100. In this example, the device 100 is positioned having a display area and a scan area on forward facing portions of the device 100. In this example, the device 100 has angled faces 102, 104 that are positioned in a generally vertical orientation. A first face 102, in this orientation considered a top face, includes an aperture through which a display is visible, and the second face 104, considered here as a bottom face, includes a further aperture through which an optical code reader is exposed. Details regarding construction of the device, and other components of the device 100, are discussed in Part II, below.

Generally, the stand extension 254 positions the device 100 at a height such that the first face 102 is angled to be visible to a standing user, for example at a height of between 30 and 42 inches. Other heights are usable as well. Furthermore, because the second face 104 is angled slightly downward, it may facilitate easier alignment with a handheld paper or device that displays an optical code to be captured by the optical code reader.

Figure 4:
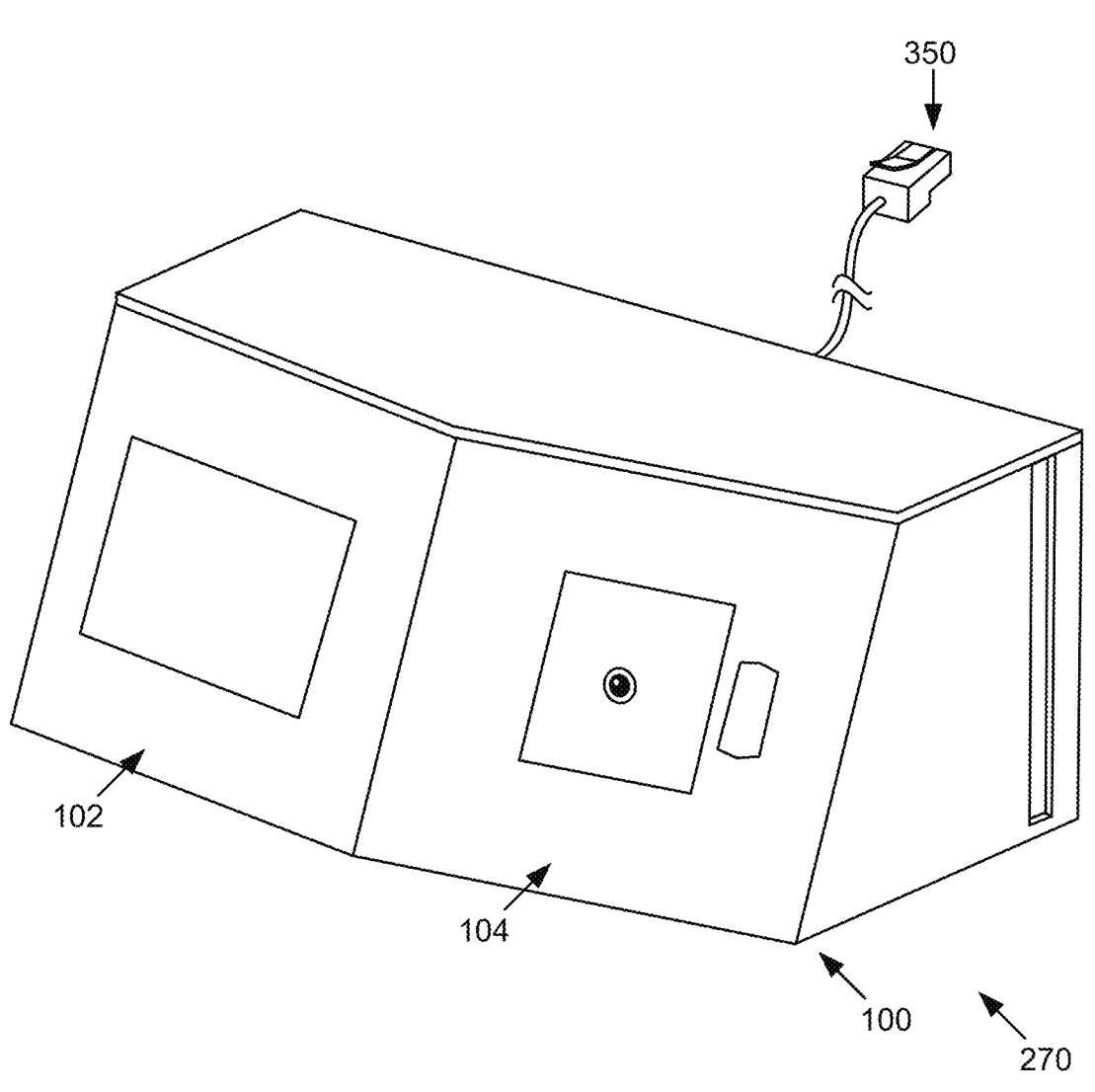
FIG. 4 is a schematic perspective view of a further example installation of a contactless optical user identification device, according to an example embodiment.

In the construction seen in FIG. 3, the installation 250 may be particularly useful in locations where no countertop or surface to which the device 100 may be mounted is available, for example at an open entrance to the location 200. By way of contrast, FIG. 4 is a schematic perspective view of a further example installation 270 of a contactless optical user identification device 100, according to an example embodiment. In this example, the installation 270 places the device 100 in a generally horizontal orientation, for example for placement or installation on a tabletop. Such a configuration may be appropriate, for example, at a customer service counter or desk at which a user wishes to interact with another user, such as an administrative user, who may be presented with information regarding the user U1 who wishes to identify him/herself to initiate a transaction.

It is noted that the positions and configurations of FIGS. 3-4 are merely exemplary of possible use cases for a device 100. Other positions or configurations are possible as well, such as mounting to a wall or door, or otherwise repositioning the device in a different orientation than that shown.

II. Example Embodiments of a Contactless Optical User Identification Device

Figure 12:
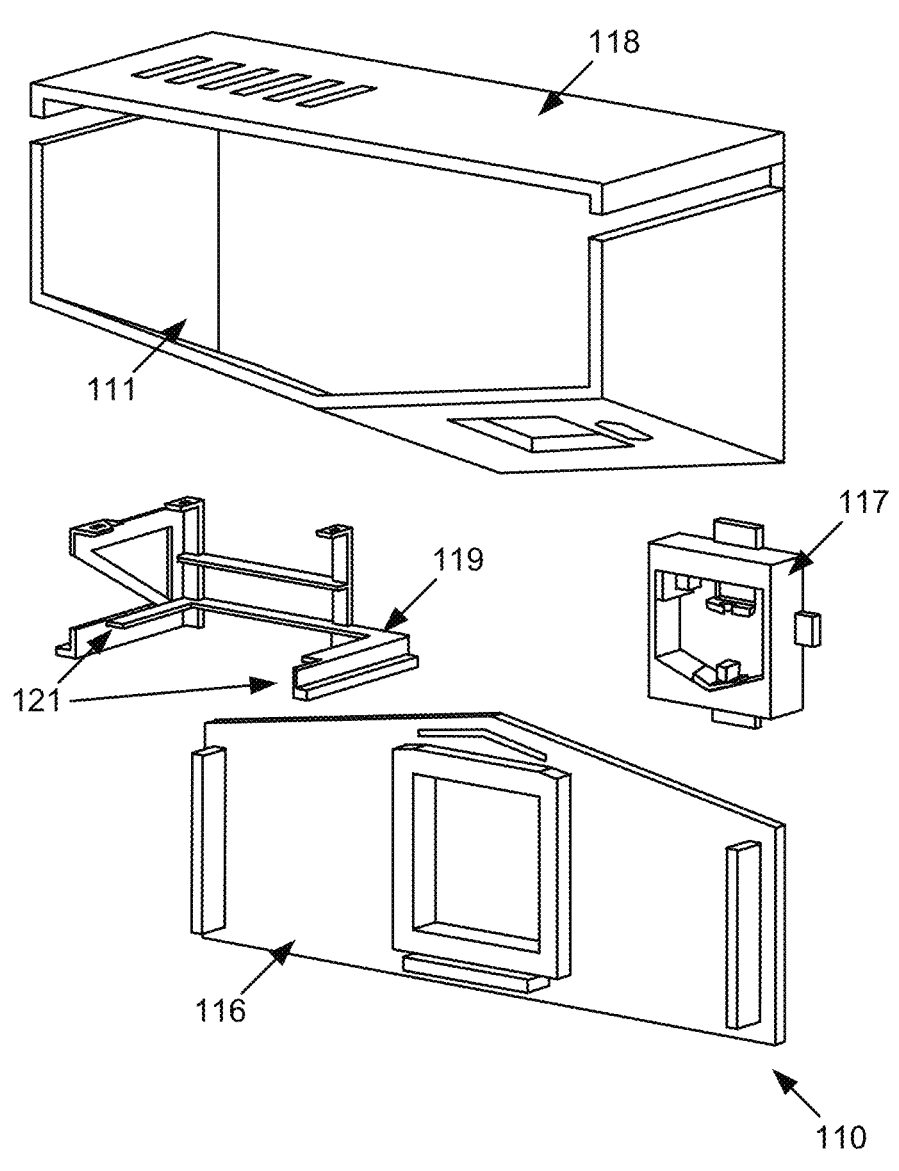
FIG. 12 is an exploded view of the contactless optical user identification device of FIG. 5.
Figure 13:
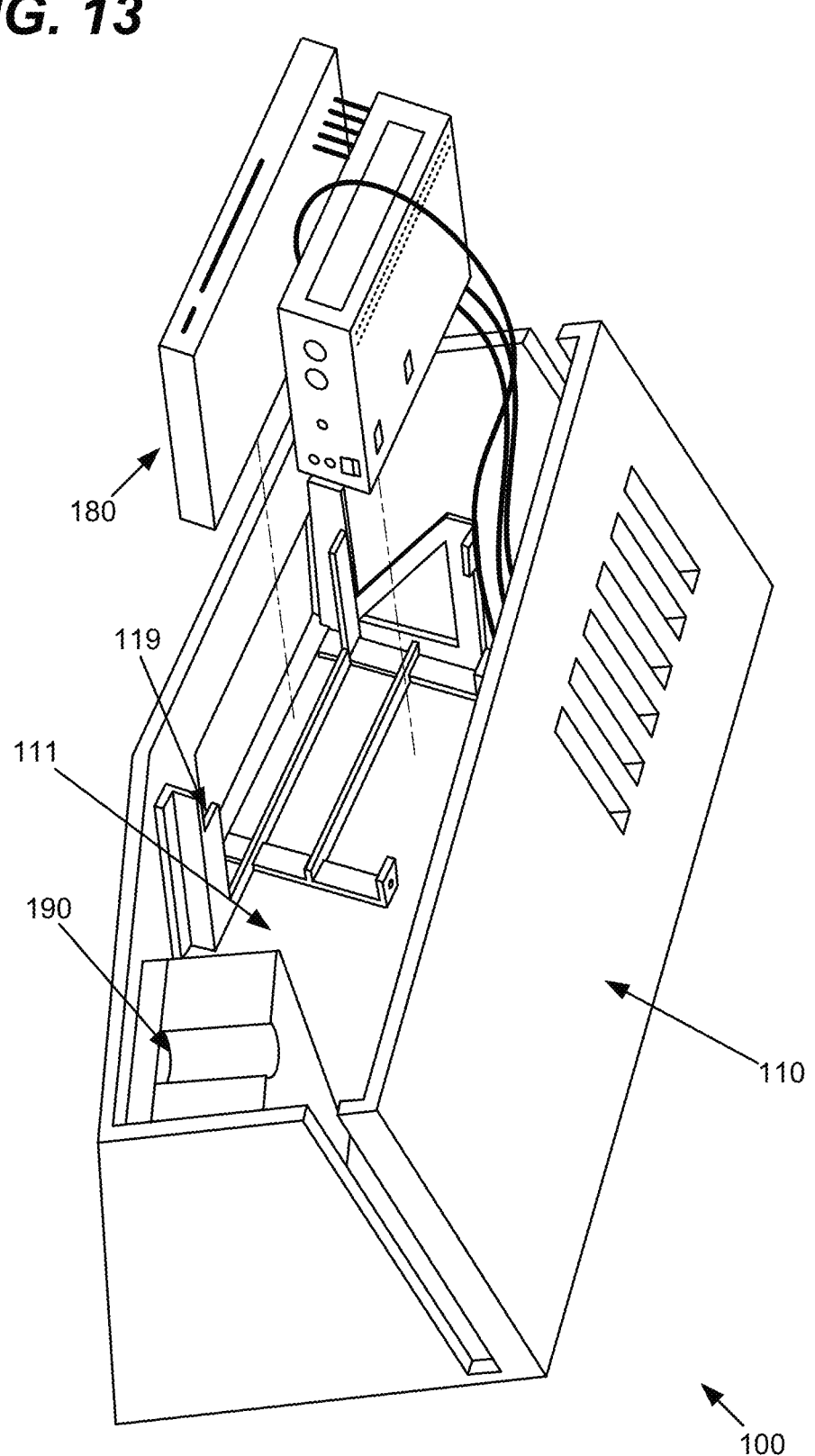
FIG. 13 is a partially exploded top perspective view of aspects of the contactless optical user identification device of FIG. 5.
Figure 14:
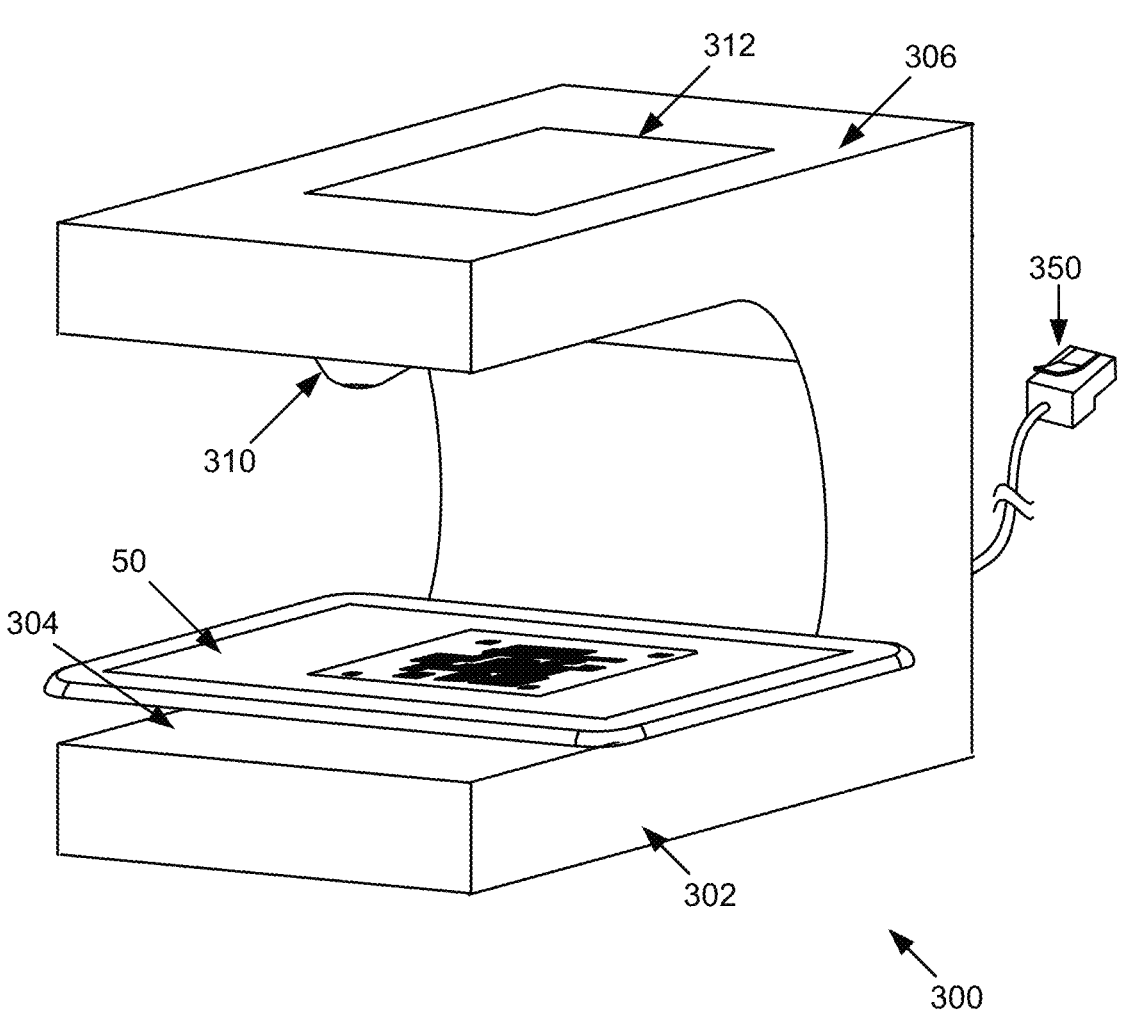
FIG. 14 is a front perspective view of a contactless optical user identification device, according to a further possible embodiment.
Figure 15:
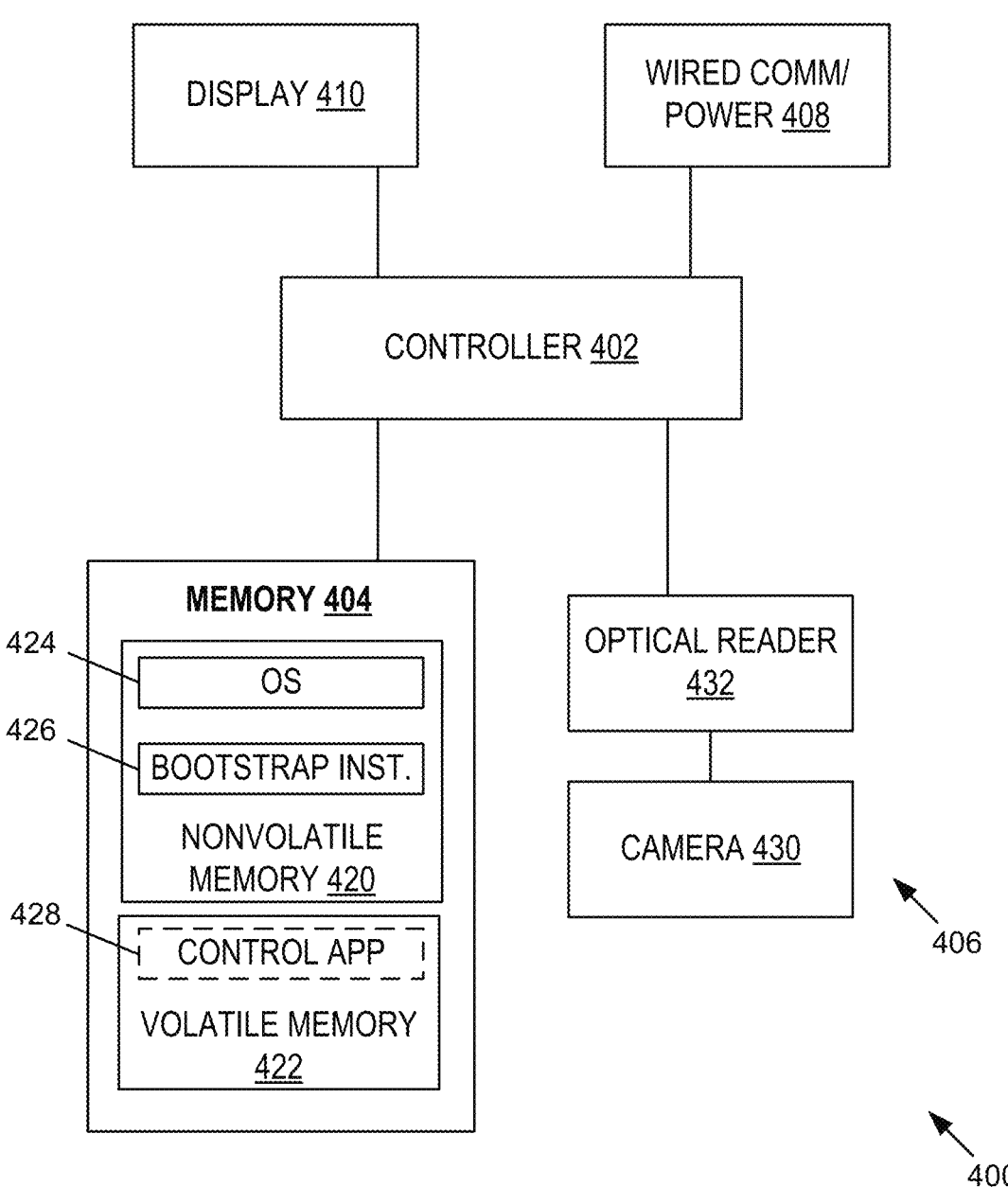
FIG. 15 is a schematic block diagram of a contactless optical user identification device, according to certain embodiments described herein.

Referring now to FIGS. 5-15, details regarding example embodiments of a contactless optical user identification device are provided. FIGS. 5-13 show a physical construction of an example device 100, with FIGS. 5-11 illustrating an ornamental appearance of the device, and FIGS. 12-13 showing details of construction of the device, in the example embodiment. FIG. 14 shows an alternative embodiment of a device, and FIG. 15 illustrates an example block diagram of circuitry of devices implemented in accordance with the present disclosure.

In the example shown in FIGS. 5-13, the device 100 comprises a housing 110 that includes a front side 120, rear side 130, top 140, bottom 150, and left and right sides 160, 170, respectively. In the example shown, the front side 120 has the first face 102 and second face 104, described above. The first face 102 includes an aperture 103 through which a display may be exposed. The aperture 103 is shown in dashed lines, as the shape, relative size on the first face 102, and orientation or other particular appearance are generally a matter of design choice. Furthermore, it is noted that in some instances, aperture 103 may be excluded from the device entirely (e.g., in embodiments in which the device 100 does not include a display, described below).

Additionally the second face 104 has an aperture 105 through which an optical device may be exposed. As with the aperture 103, aperture 105 is shown in dashed lines, as the shape, relative size on the second face 104, and orientation or other particular appearance are generally a matter of design choice. In the example shown, the first face 102 and second face 104 are angled relative to one another, and angled slightly upwardly toward a top side 106 of the housing 110.

Figure 5:
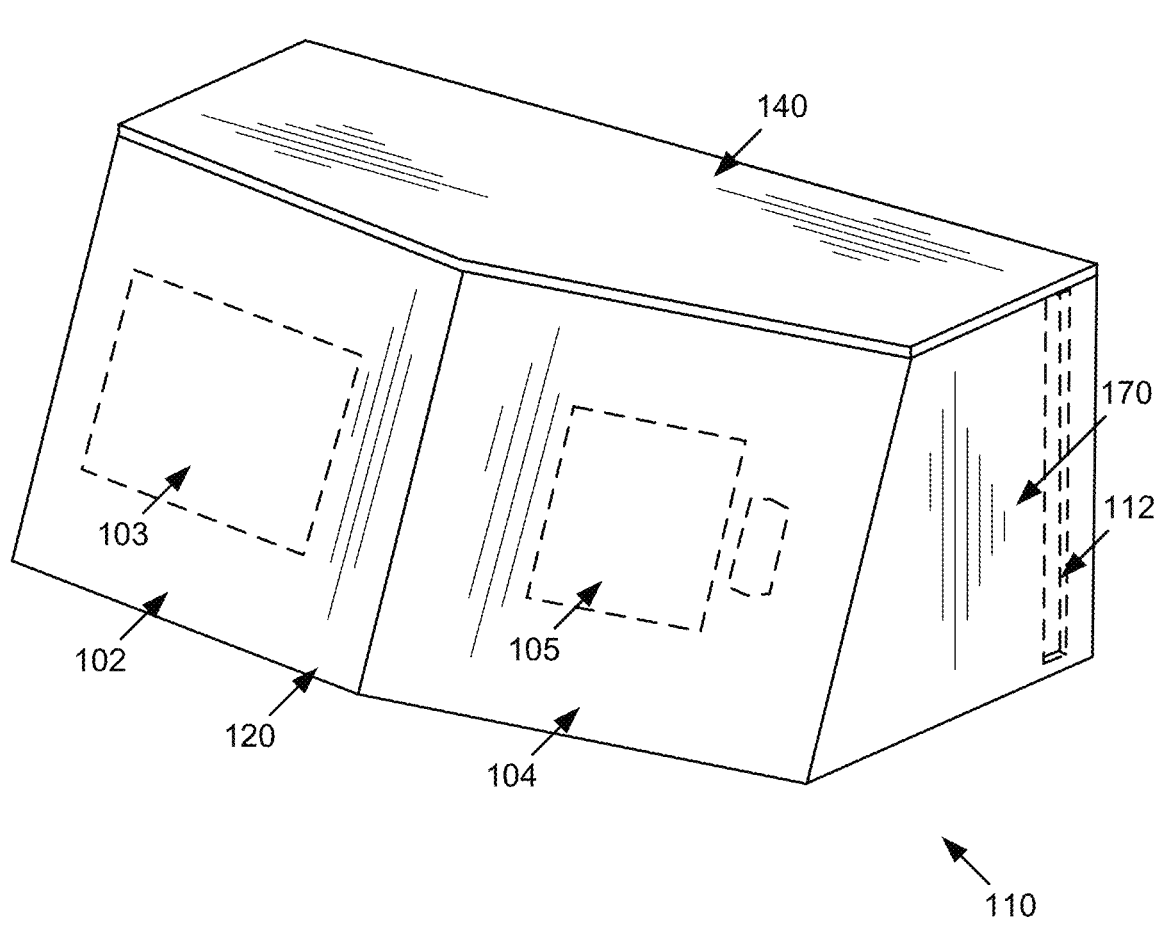
FIG. 5 is a perspective view of a contactless optical user identification device according to an embodiment of the present disclosure.
Figure 6:
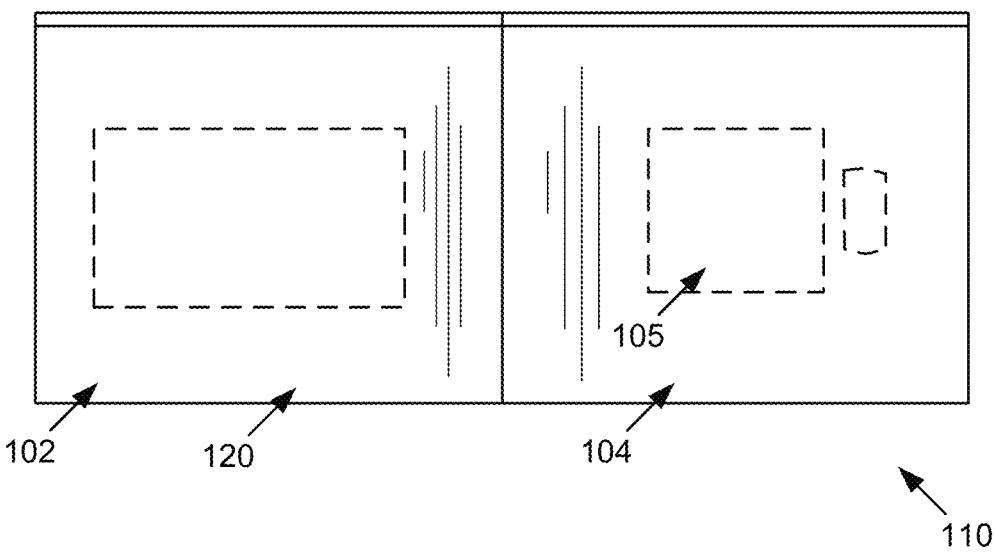
FIG. 6 is a front plan view of the contactless optical user identification device of FIG. 5.
Figure 7:
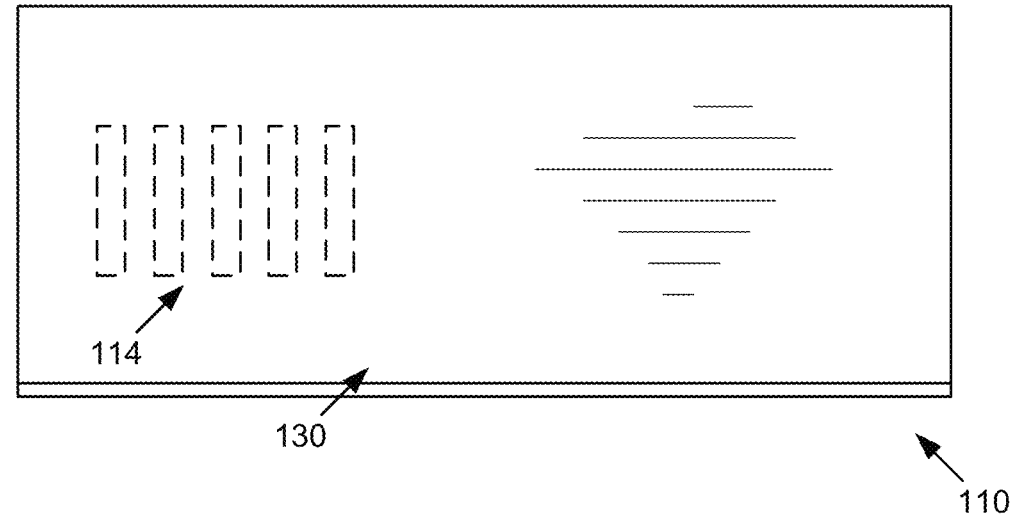
FIG. 7 is a rear plan view of the contactless optical user identification device of FIG. 5.
Figures 8, 9:
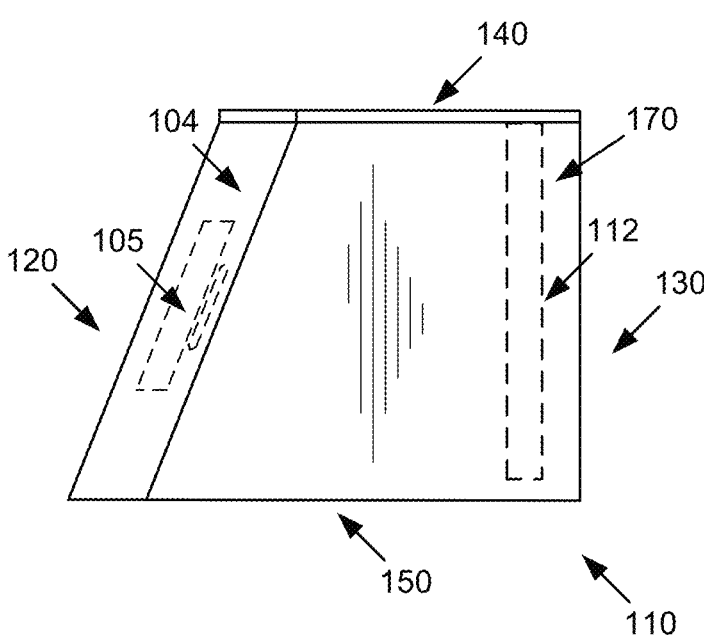
FIG. 8 is a right side plan view of the contactless optical user identification device of FIG. 5.
FIG. 9 is a left side plan view of the contactless optical user identification device of FIG. 5.
Figure 10:
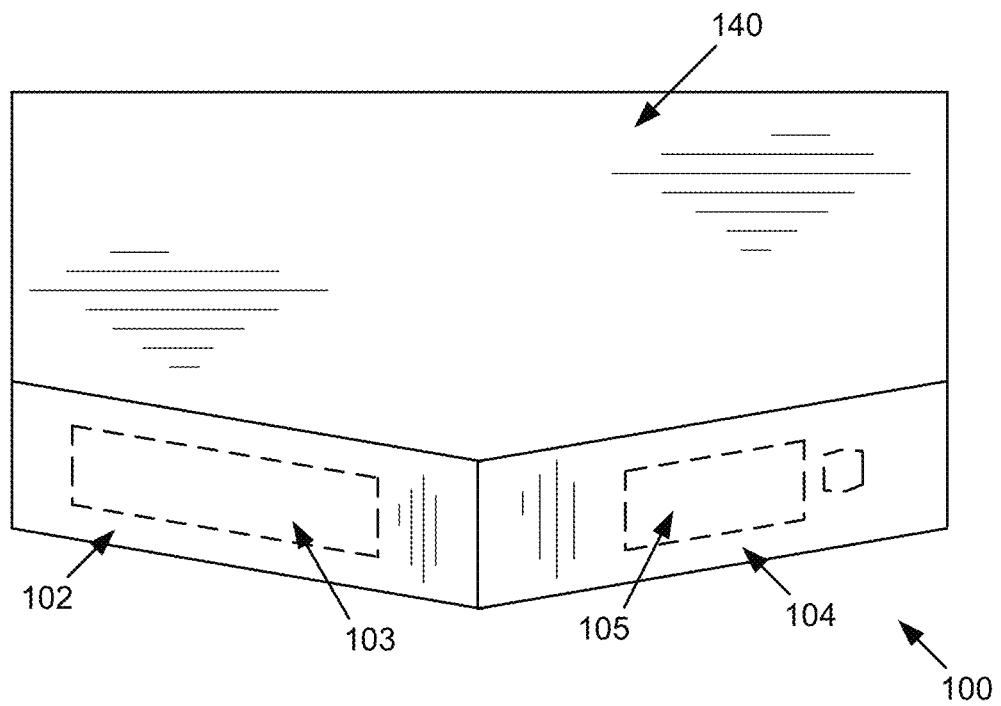
FIG. 10 is a top plan view of the contactless optical user identification device of FIG. 5.
Figure 11:
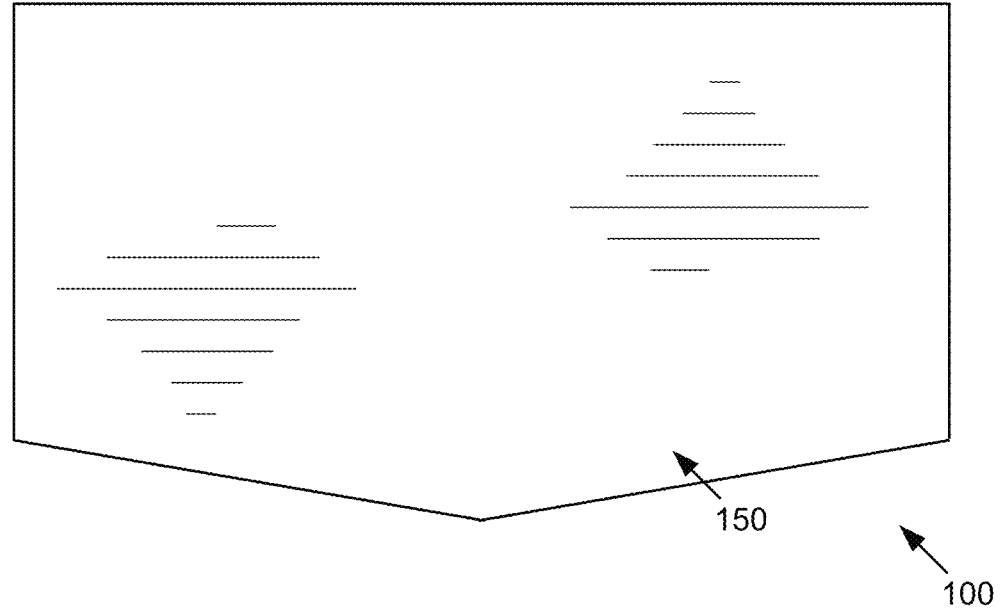
FIG. 11 is a bottom plan view of the contactless optical user identification device of FIG. 5.

As seen most easily in FIG. 5, a side vent aperture 112 may be located in one or both of the left and right sides 160, 170, and provides an opening into an interior volume 111 of the housing 110. Additionally, as seen in FIG. 7, a set of vent apertures 114 are positioned on the rear side 130 of the housing 110, and may provide airflow into the interior volume 111 for cooling of electronics housed therein. The side vent aperture 112 and rear vent apertures 114 are optional, and their presence, size, and positioning are largely a matter of design choice as well. For example, in circumstances where the device 100 will be mounted to a wall from a rear side 130 of the housing 110, the rear vent apertures 114 may be excluded entirely.

FIG. 12 is an exploded view of the housing 110 of the contactless optical user identification device 100 of FIG. 5. The housing 110 has a removable top panel 116 that is separable from a main body 118 of the housing 110 to expose the interior volume 111. An optional clip piece 117 may be attached to the top panel 116, and may close off the top panel 116 by holding one or more insignias or logo clip elements (not shown).

One or more carriers 119 may be installable within the interior volume 111, and may be mounted against an interior side of the first and/or second faces 102, 104, respectively. The carrier may include a slot arrangement 121 that allows a display or an optical code reader to be easily mounted and removed from a position exposed through apertures 103, 105, respectively. As seen more specifically in FIG. 13, with the top panel 116 removed, a display panel device 180 and an optical reader device 190 may slide into position and be retained in alignment with apertures 103, 105, respectively.

The housing 110 may be a variety of sizes, but at least sized to retain at least an optical reader device 190, and optionally display panel device 180, therein. In example embodiments, the housing 110 may, in its horizontal orientation seen in FIG. 4, be 3-6 inches in height, 6-12 inches in width, and 3-6 inches in depth. Other sizes or arrangements are possible as well.

FIG. 14 is a front perspective view of a contactless optical user identification device 300, according to a further possible embodiment. The device 300 generally has the same functionality and electrical circuit structure as device 100 described above, and as such, where functionality or circuitry are described herein, such description is made relative to device 100. However, device 300 illustrates a further possible appearance of such a device. In the example shown, device 300 is illustrated as having a base region 302 on which a user mobile device 50 is depicted. The base region 302 may include one or more markings or indicia indicating that the user U1 should place the mobile device 50 onto this platter portion 304 of the base region 302. Additionally, an overhang region 306 may extend over the base region 302, and includes an optical code reader 310 oriented toward the platter portion 304. The overhang region may further include a display 312 on a top side of the overhang region 306, and may display instruction and confirmation messages to a user before and/or after the user scans his/her mobile device 50 to capture an optical code for user identification.

As seen in FIG. 14 (as well as FIG. 4), both devices 100, 300 are generally configured for wired communication with an enterprise network. In the example shown, an RJ-45 plug 350 is in wired communication with circuitry within the devices 100, 300, and protrudes from a housing of the devices 100, 300, respectively. The RJ-45 plug 350 is used to provide power and communications to the device, as described below.

FIG. 15 is a schematic block diagram of circuitry 400 of a contactless optical user identification device, according to certain embodiments described herein. The circuitry 400 may be included in one or either of the devices 100, 300 of FIGS. 5-14, above.

In the example shown, the circuitry 400 includes a controller 402 communicatively connected to a memory 404. The controller 402 is further communicatively connected to an optical reader circuit 406 and a wired communication interface 408. Optionally, as shown the controller 402 is further communicatively connected to a display 410.

In example embodiments, the controller 402 can be a programmable circuit, such as a programmable microprocessor. The controller 402 may be implemented as a special-purpose integrated circuit (e.g., an ASIC) or a field-programmable circuit. In an example implementation, controller 402 may be implemented as a system-on-chip microprocessor operable according to a specific computing architecture. In examples, the controller 402 may be implemented using an ARM-compatible central processing unit, for example as may be included in a Raspberry Pi-based single-board computer (SBC).

The memory 404 includes a non-volatile memory 420 and a volatile memory 422. The non-volatile memory 420 may be, for example, a writable memory that maintains data and instruction storage when power is not supplied to the circuitry 400. The volatile memory 422 may be, for example, a writable memory that is maintained while the circuitry is operational, but which does not persist data or instructions when power is not supplied.

In the example shown, the non-volatile memory 420 stores general purpose operating instructions, including a general purpose operating system 424, as well as bootstrap instructions 426. The general purpose operating system 424 may include firmware executable by the controller 402 to manage external devices and host software programs for execution via the controller 402. In example embodiments, the general purpose operating system 424 can be implemented as an ARM-based operating system, such as Raspberry Pi OS or another Linux-based operating system optimized for embedded systems design.

The bootstrap instructions 426 may be configured for execution, hosted by the general purpose operating system 424, automatically upon power-up of the circuitry 400 of a device. The bootstrap instructions 426 include instructions to establish communication with a remote bootstrap server, and provide an identifier of the device to the remote bootstrap server. For example the identifier may be an identification code assigned to the device and known by the bootstrap server 22, or may be an identifier unique to the device, such as a hardware address of the wired communication interface 408 (e.g., a MAC address). The bootstrap server may be identified in the bootstrap instructions as having a particular domain and device name within enterprise network 30, or a particular IP address at which the bootstrap server may be accessed. Other ways of addressing the bootstrap server 22 are possible as well.

The bootstrap instructions 426 further include instructions to receive special-purpose operating instructions 428 from the bootstrap server 22, which are selected based on the identifier of the device. The special-purpose operating instructions 428 may be stored in the volatile memory 422 upon receipt.

In the example shown, the optical reader circuit 406 includes an image capture device, such as a camera 430, as well as an optical code reader circuit 432. When actuated by the controller 402, the optical code reader circuit 432 may actuate the camera 430 to capture one or more images (e.g., a series of still images or a video image having a plurality of frames) and the optical code reader circuit 432 is adapted to recognize and decode QR codes, bar codes, or other machine-readable codes appearing in captured images. Preferably, the optical code reader circuit 432 is capable of decoding machine-readable optical codes, such that, in response to actuation by controller 402, the optical code reader circuit 432 is only required to respond with the interpreted optical code (and optionally a timestamp at which the code is captured, and other information such as a success, failure, or confidence level metric related to the accuracy of the reading process for the returned optical code).

In particular embodiments, the optical reader circuit 406 is an integrated solution in which the optical code reader circuit 432 provides a communication connection to the controller 402 that is limited to transmission of a translated, numerical code. For example, in example embodiments, the optical reader circuit 405 is connected to controller 402 via a serial connection, such as may be implemented using an RS485 serial data connection standard. In such embodiments, the optical reader circuit 406 may not be configurable to directly provide captured image data from camera 430 to the controller 402; rather, only translated codes and associated captured metadata (e.g., a time of capture, accuracy/confidence metrics, etc.) may be provided. This has the advantage of ensuring privacy to users, and avoidance of the possibility that the contactless optical user identification device may be hacked to obtain camera data therefrom, or may otherwise be used in a manner that could compromise privacy of individuals in proximity to such a device.

In the example shown, the wired communication interface 408 comprises a twisted pair (e.g., RJ-45) ethernet connection for wired connection to enterprise network 30. In preferred examples, the wired communication interface 408 provides a power-over-ethernet (PoE) connection such that connecting the wired communication interface to a network jack is the only required connection. This is advantageous because only a single connection is required, rather than separate power and network connections. It also reduces the likelihood that a device would be removed from the enterprise network without interrupting both power and a network connection. This would cause the special-purpose operating instructions 428 to be erased, thereby removing any sensitive data or instructions from the device.

The display 410 may be any of a variety of small form-factor displays that may fit within the housing of the device, and which is able to operate with relatively low power requirements such that the overall circuitry 400 may be powered via the PoE supply via the wired communication interface 408. In example embodiments, the display can be implemented using a small form-factor LCD display, such as a 1 to 3 inch TFT LCD display. Of course, other form factors, and display types, can be used as well, so long as they would meet power consumption and heat dissipation requirements for the overall device.

Figure 23:
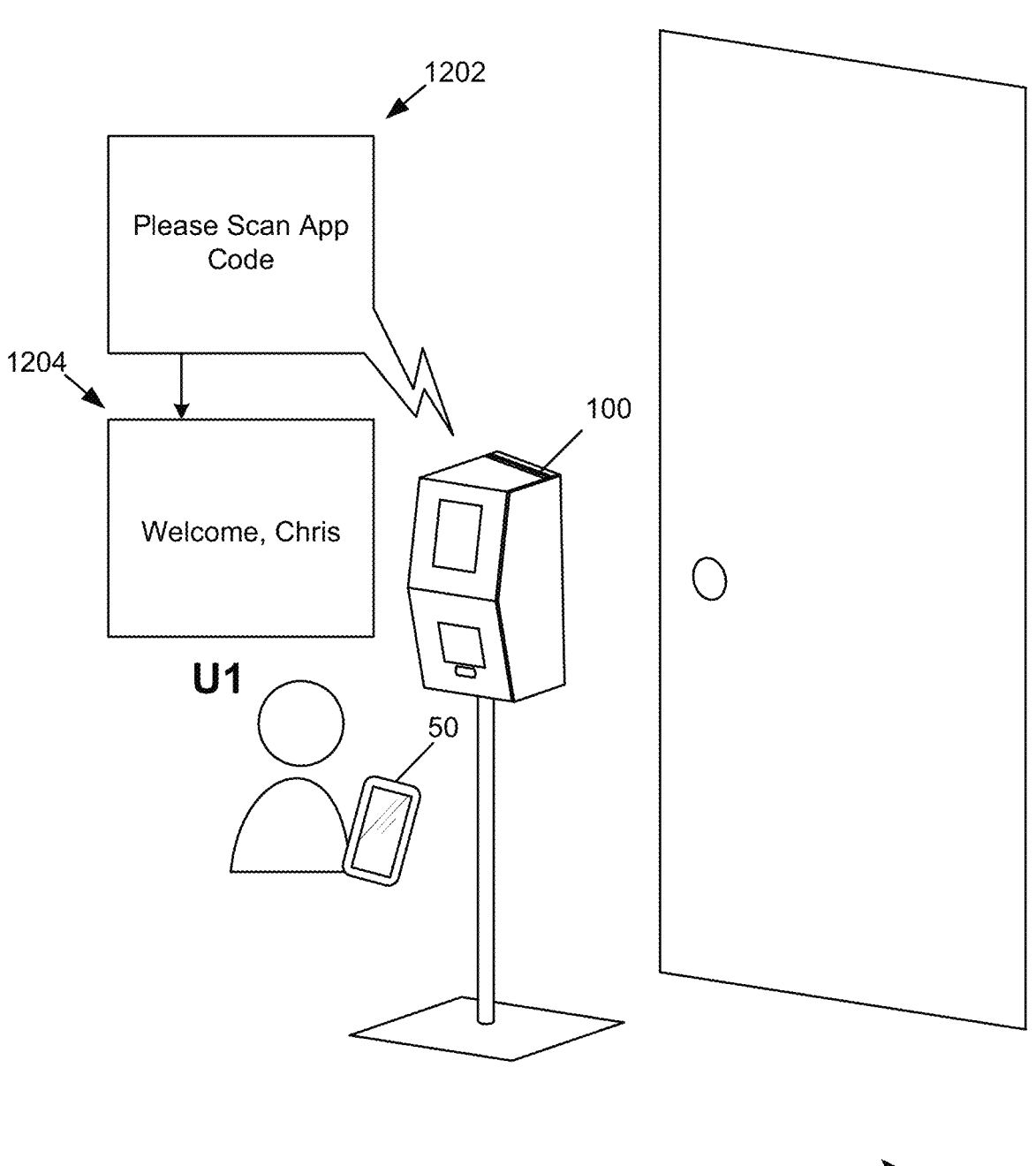
FIG. 23 is a schematic example access process usable in conjunction with a contactless optical user identification device as described herein.
Figure 24:
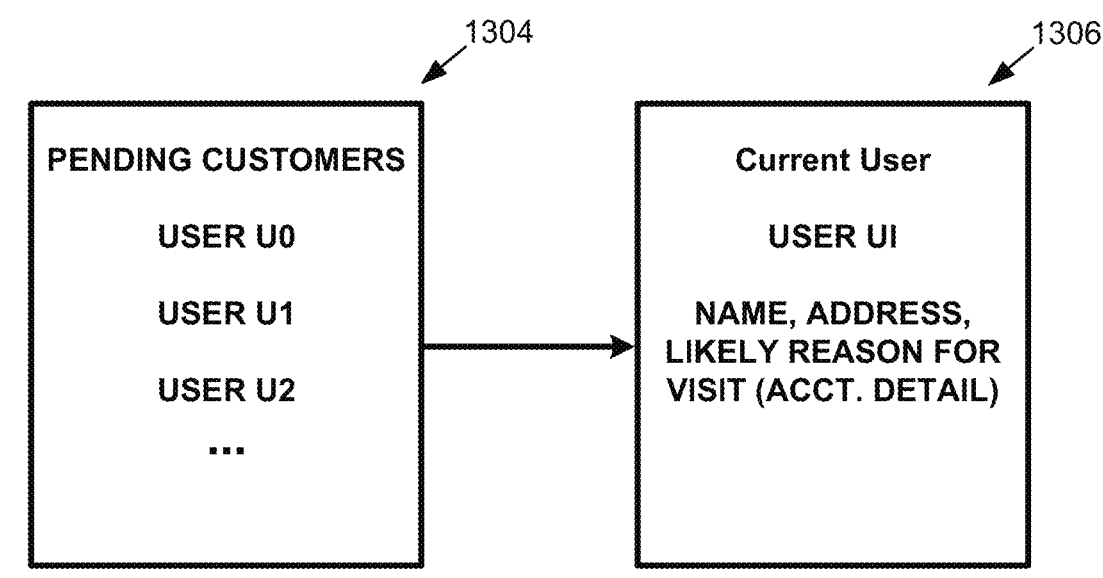
FIG. 24 is a schematic example user data presentation process usable in conjunction with a contactless optical user identification device as described herein.
Figure 24:
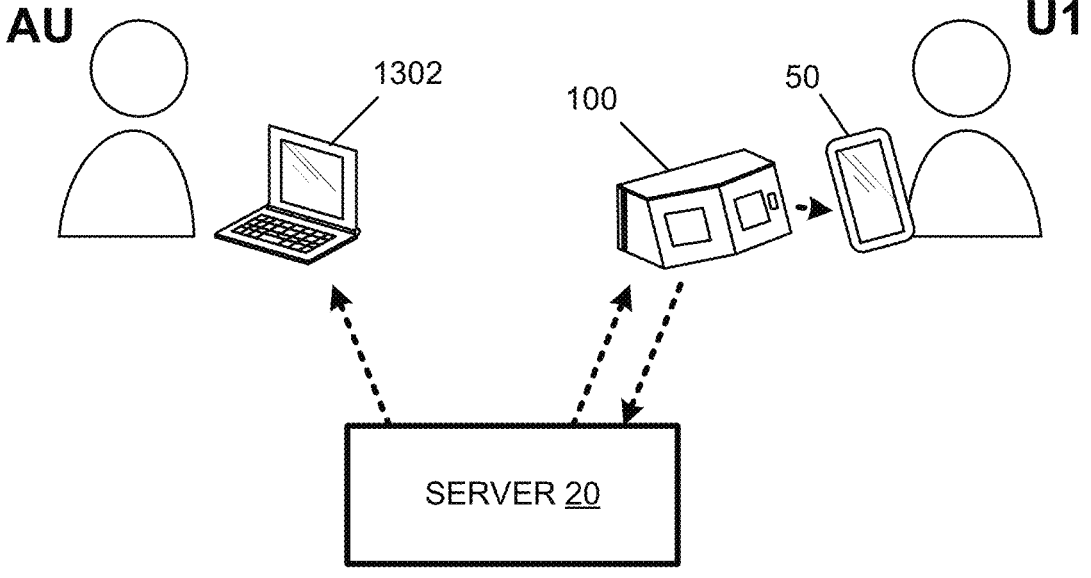

III. Example Operation, Communication Connections, and Applications of a Contactless Optical User Identification Device Now referring to FIGS. 16-24, additional details are provided regarding an environment in which a contactless optical user identification device may be used. In particular, FIGS. 16-18 describe details of server systems that interact with such a device within an enterprise environment, and FIGS. 19-22 illustrate example methods and message flows describing interactions between a device and such server systems. FIGS. 23-24 illustrate example use cases based on the interactions described in FIGS. 19-22.

Figures 16, 17:
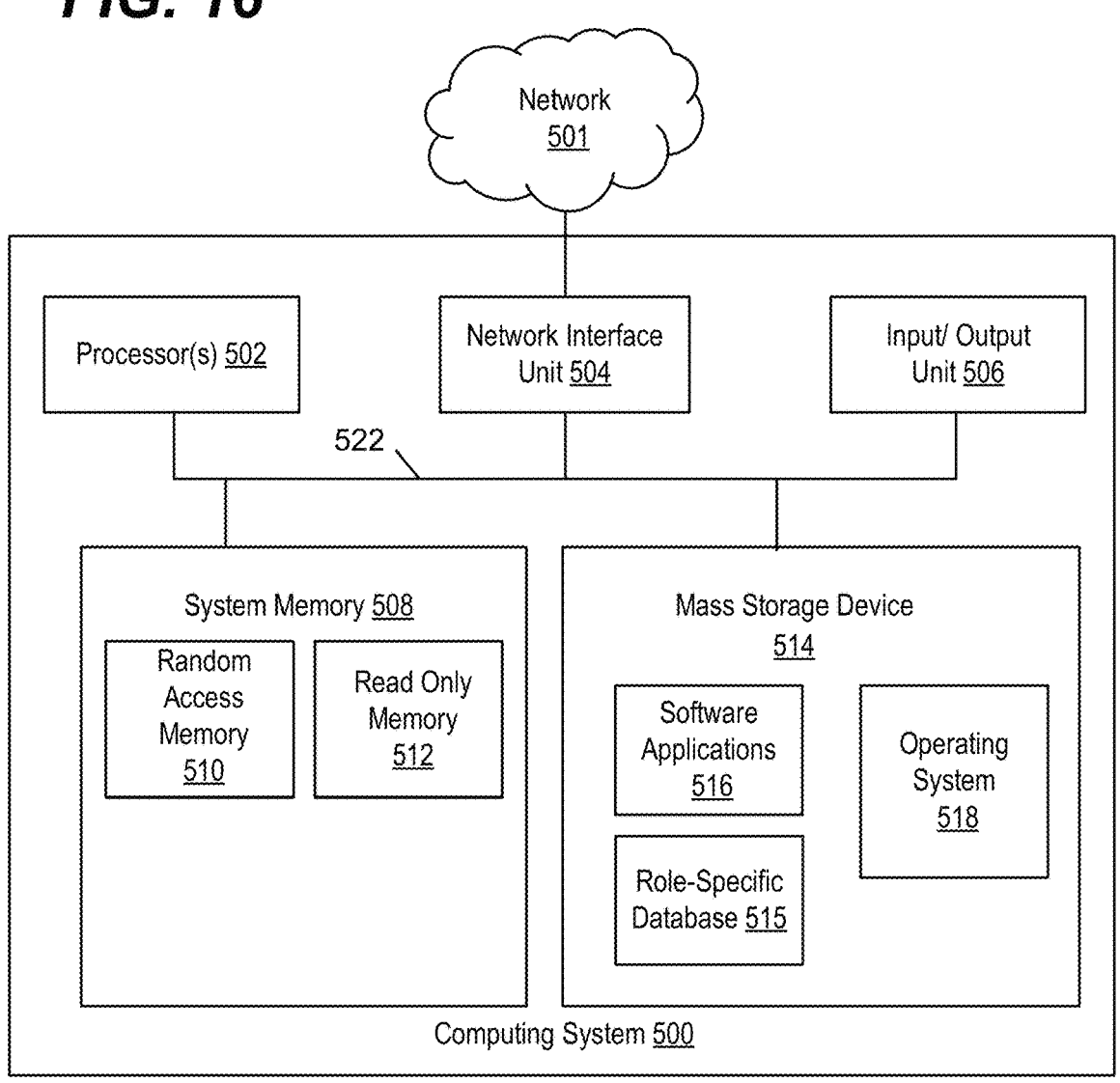
FIG. 16 is a schematic block diagram of a computing device usable as a server computer in aspects of the present disclosure.
FIG. 17 is a table illustrating communication settings and control personas of each of a plurality of contactless optical user identification devices used herein, as may be managed using an enterprise server system.

Referring first to FIG. 16, a schematic block diagram of a computing device 500 usable as a server computer in aspects of the present disclosure. The computing device 500 can, specifically, be used to implement all or a portion of an enterprise server 20, and can be specifically used as either the bootstrap server 22 or identification server 24 described herein.

In the embodiment shown, the computing system 500 includes one or more processors 502, a system memory 508, and a system bus 522 that couples the system memory 508 to the one or more processors 502. The system memory 508 includes RAM (Random Access Memory) 510 and ROM (Read-Only Memory) 512. A basic input/output system that contains the basic routines that help to transfer information between elements within the computing system 500, such as during startup, is stored in the ROM 512. The computing system 500 further includes a mass storage device 514. The mass storage device 514 is able to store software instructions and data. The one or more processors 502 can be one or more central processing units or other processors.

The mass storage device 514 is connected to the one or more processors 502 through a mass storage controller (not shown) connected to the system bus 522. The mass storage device 514 and its associated computer-readable data storage media provide non-volatile, non-transitory storage for the computing system 500. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 500.

According to various embodiments of the invention, the computing system 500 may operate in a networked environment using logical connections to remote network devices through the network 501. The network 501 is a computer network, such as an enterprise intranet and/or the Internet. In an example, the network 501 is the enterprise network 30 described herein. The network 501 can include a LAN, a Wide Area Network (WAN), the Internet, wireless transmission mediums, wired transmission mediums, other networks, and combinations thereof. The computing system 500 may connect to the network 501 through a network interface unit 504 connected to the system bus 522. It should be appreciated that the network interface unit 504 may also be utilized to connect to other types of networks and remote computing systems. The computing system 500 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the computing system 500 can store software instructions and data. The software instructions include an operating system 518 suitable for controlling the operation of the computing system 500. The mass storage device 514 and/or the RAM 510 also store software instructions, that when executed by the one or more processors 502, cause one or more of the systems, devices, or components described herein to provide functionality described herein. For example, the mass storage device 514 and/or the RAM 510 can store software instructions that, when executed by the one or more processors 502, cause the computing system 500 to receive and execute managing network access control and build system processes.

Depending on the specific implementation of a server type that is implemented using the computing device 500, the mass storage device 514 may store a variety of types of data, (e.g., in a database 515), described below in conjunction with FIGS. 17-18. For example, if implementing a bootstrap server, a database including device identifiers, roles, and special-purpose operating instructions for fulfilling such roles may be stored. If implementing an identification server, the database 515 may store device identifiers, but also may store user identifiers and specific actions to take in response to such user identifiers (e.g., either in response to the device or communication with other systems within the enterprise network).

FIG. 17 is a table 600 illustrating communication settings and control personas of each of a plurality of contactless optical user identification devices used herein, as may be managed using an enterprise server system. The table 600 may be implemented within a database of a computing system, such as database 515 of computing system 500, if the computing system were operable as a bootstrap server 22, in example embodiments. In the example shown, the table 600 includes a plurality of entries, each entry being associated with a different contactless optical user identification device. The table includes a unique identifier of each device, for example a hardware identification address. The table further includes an IP address that is assignable to each device, as well as one or more keys associated with the device. Still further, the table stores an identifier of one or more control programs that may be executed at the device, depending on the particular application to which the device is directed (e.g., access control, user check-in or user profile retrieval, etc.).

In use, when a bootstrap server 22 receives a request from a contactless optical user identification device that includes the device's identifier, that identifier can be looked up in table 600. The device may then be assigned a static IP address and provided one or more encryption keys, as well as special-purpose operating instructions that are identified in the table 600. The contactless optical user identification device may then use the keys for storage of user data and/or transmission of data exchanged with an identification server, such as identification server 24.

In some embodiments, a copy of the table 600 may be maintained at the identification server 24 as well. In such cases, the table may be used differently. That is, subsequent to a device obtaining special-purpose operating instructions, the device may transmit to such an identification server 24 a device identifier alongside a user identification code that is encrypted using one or more encryption keys that were provided to the device. Accordingly, the identification server 24 may retrieve appropriate encryption keys for decryption of the message based on the identity of the device, and may optionally also validate the role of the device. By validating the role of the device, the identification server 24 may determine what downstream tasks to perform, for example transmitting a message for display at the device or at another computing system, transmitting an unlocking or other actuating signal to an access control system, or other tasks.

FIG. 18 is a further table 700 illustrating user roles in communication with the contactless optical user identification device described herein, as may be managed using an enterprise server system. In particular, the table 700 may be stored at an identification server 24, and is used to validate and identify users based on received optical codes that are captured at a contactless optical user identification device.

In the example shown, the table 700 includes a plurality of entries including user identification information, role information, a list of authorized devices associated with that user, and an identification code. Generally the user identification information can include specific identifying information of a user, such as a name and contact information of the user, or may typically store a pointer to another table providing detailed user information as may be required for access or presentation applications.

The role information defines the types of roles associated with the user. For example, a user may be a customer who is visiting a premises, and may have limited access rights to restricted areas, but it may be desirable for that user to check in and have an employee (e.g., an administrative user) be displayed identifying information of that customer user. The user may also be an employee acting as an administrative user, and that user may have different sets of access or presentation roles, and may also have an administrative role available with respect to certain ones of the contactless optical user identification devices, for example to initialize and select appropriate special-purpose operating instructions for all or some devices.

The identification code included in the table corresponds to a code received from a contactless optical user identification device that identifies that user. The code may be a static code, or may be changed periodically in cooperation with an application executing on that user's mobile device (e.g., a rolling code that changes every 30 seconds to 1 minute). If a static code, in some instances, the code, and the entire table entry, may be associated with a one-time access right, rather than a reusable access pass.

In further example embodiments, multiple codes may be maintained within the table for each user. Different codes may have different time ranges associated therewith. When the identification server 24 receives a code for identification from a device, in cases where the code is accompanied by a timestamp indicating its time of capture, valid identification of the user may require both the code to be valid, and to have been captured within a valid timeframe (as defined within time ranges included in the table 700. In this way, each code may have a particular temporal eligibility. This may be used to define particular times during which a one-time use access code may be valid, may define specific times of day that a user's code is valid, and/or may be used to implement rolling codes by periodically updating the code delivered to the contactless optical user identification device and updating the code and valid timeframe included in the table 700.

Figure 19:
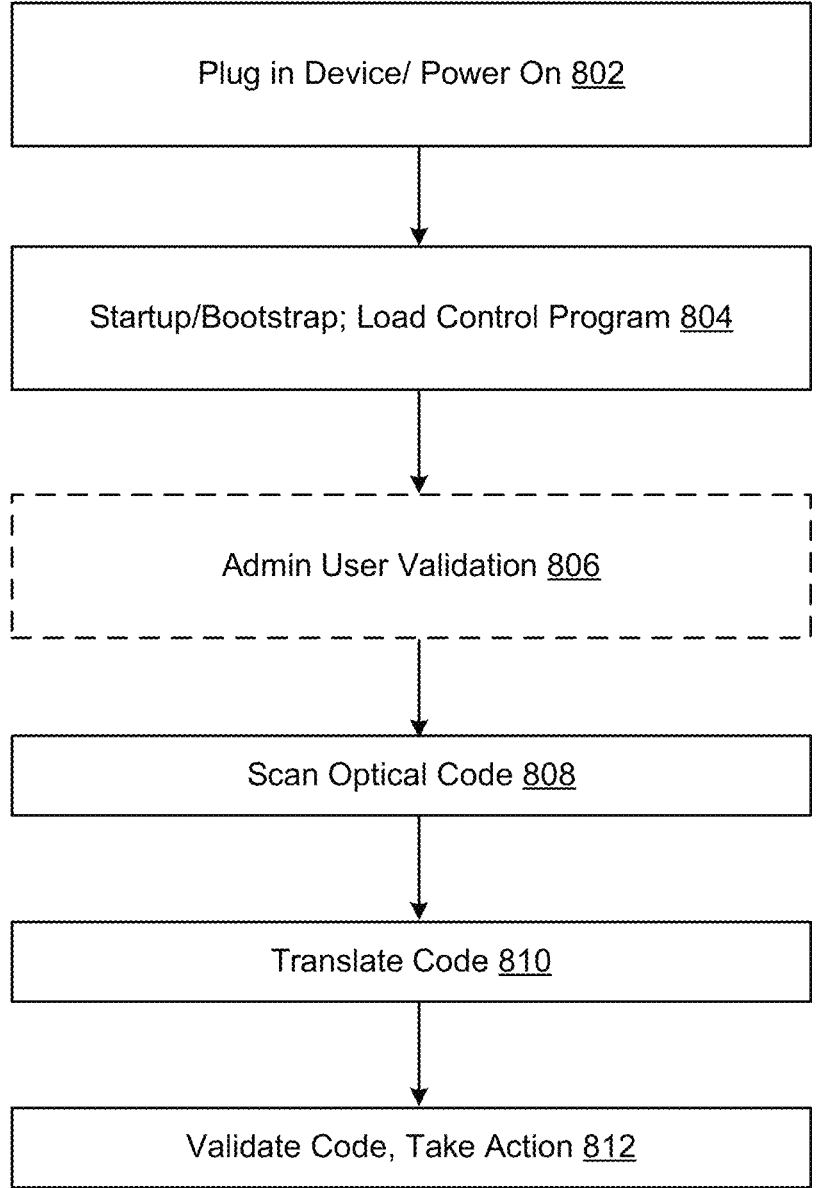
FIG. 19 is a flowchart of an example method of operation of a contactless optical user identification device, according to an example embodiment.

Referring now to FIG. 19, a flowchart of an example method 800 of operation of a contactless optical user identification device, according to an example embodiment. The example method 800 is executable at a contactless optical user identification device, such as devices 100, 300, in cooperation with an enterprise server system (such as bootstrap server 22 and identification server 24), as well as at least one user-identifying optical code.

In the example shown, the method 800 is instantiated at operation 802 upon connecting a contactless optical user identification device 100 to an enterprise network 30. As discussed above, by providing a wired connection to the enterprise network, the contactless optical user identification device 100 may be provided both a communication connection to enterprise servers, but also may be provided a power supply allowing the circuitry within the contactless optical user identification device to operate.

At operation 804, the contactless optical user identification device 100 will initiate execution of instructions, including one or more bootstrap instructions. The instructions will cause the device 100 to establish communication with a bootstrap server 22, and load control instructions, in the form of special-purpose operating instructions, into memory. An example of such an initialization process is shown in greater detail in the message flow diagram of FIG. 20.

At operation 806, an optional device validation process may be performed by an administrative user AU. In example embodiments, the device validation process may include using the device 100 to capture an optical identification code from a mobile device of the administrative user AU, and communicating that code to an identification server. Based on identification and validation of the administrative user, that administrative user may use his/her mobile device to edit one or more settings of the specific device 100 that captured a scan of the user code associated with that administrative user. Such changes to operational settings may be propagated back to the device 100 by periodic update checks performed by the device 100. An example device validation process, in accordance with the present disclosure, is illustrated in the message flow diagram of FIG. 22.

At operation 808, an optical code capture process is performed by the contactless optical user identification device 100. The optical code capture process can include optically capturing a code, such as a QR code or bar code, that is displayed on a mobile device of a user U1. Alternatively, the optical code may be displayed in a message sent to the user U1, and may have been printed for presentation at the contactless optical user identification device 100.

At operation 810, the optical code presented at the contactless optical user identification device 100 is translated into a binary code that was encoded in the optical code. Furthermore, at operation 812, the binary code is validated by transmitting that binary code, optionally in encrypted format (using keys provided to the contactless optical user identification device 100 by the bootstrap server 22), to an identification server 24. The identification server 24, optionally in cooperation with the contactless optical user identification device 100, may then take one or more actions in response to validation or identification of the user, including: providing feedback to the contactless optical user identification device 100, (e.g., for presentation on a display of that device); instructing the device 100 to take one or more further actions to grant access to a restricted access area (e.g., transmitting a message to an electronic access control system); and/or retrieving user identification and details regarding user interaction with the enterprise, and forwarding that information to an administrative user AU to greet and/or interact with user U1. Although example access and presentation activities are described herein, other types of activities are possible as well, and the above list is not intended to be limiting on the present disclosure. Details regarding an optical code capture and user identification process are provided in the message flow diagram of FIG. 21, below.

Figure 20:
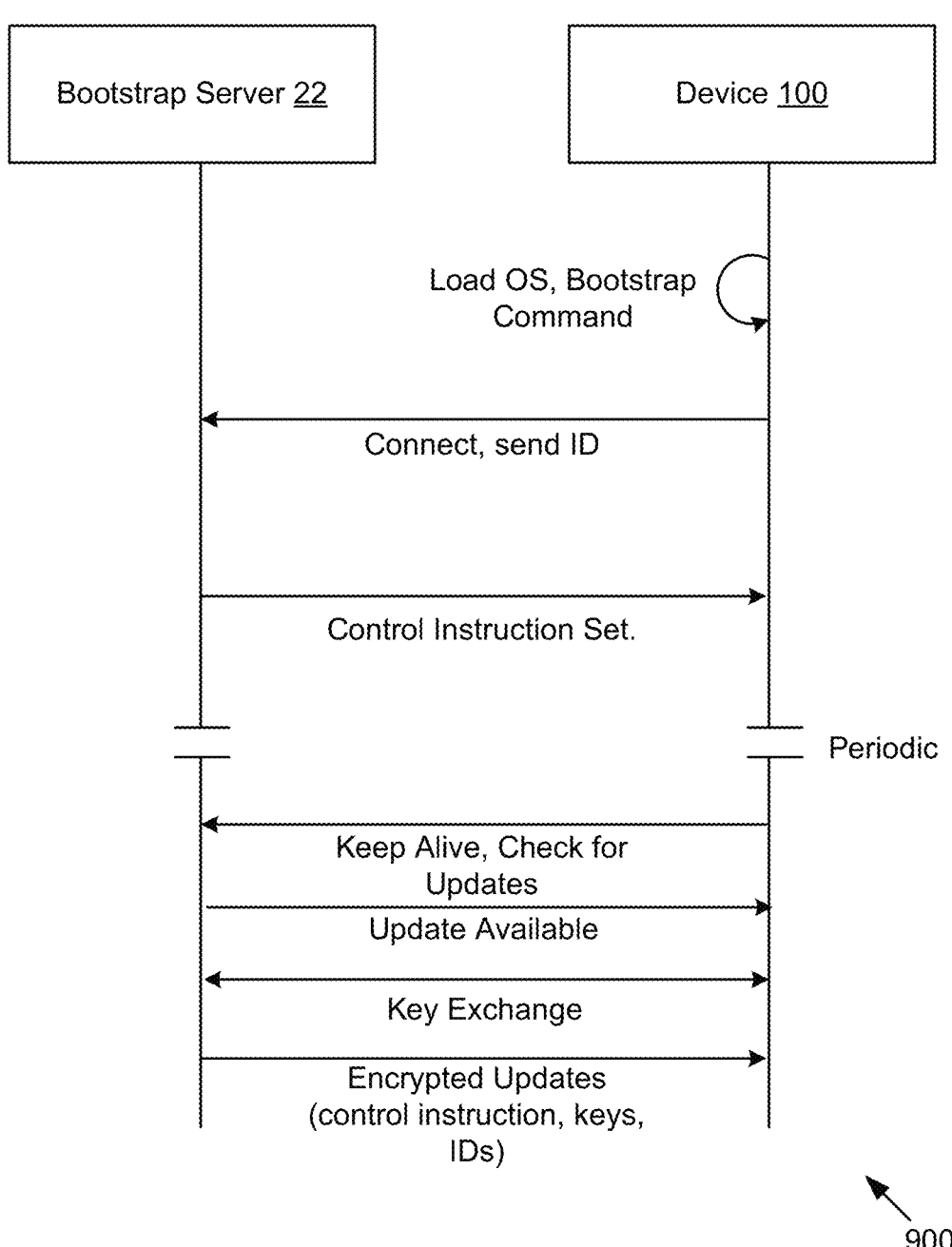
FIG. 20 is a message flow diagram illustrating an example initialization process for a contactless optical user identification device, according to an example embodiment.

FIG. 20 is a message flow diagram illustrating an example initialization process 900 for a contactless optical user identification device, according to an example embodiment. In general, the initialization process 900 is performed in response to execution of bootstrap commands at the contactless optical user identification device 100, (e.g., upon power up of such a device).

In the example shown, the initialization process 900 includes loading a general purpose operating system and bootstrap command, and then connecting to a bootstrap server from the device 100 based on connection information included in the bootstrap commands. The device 100 will send its unique identification (e.g., a hardware address) and receive in response special-purpose operating instructions (e.g., control instructions) which are maintained in volatile memory of the device 100 and used to define actions taken by the device in response to capture and translation of optical codes.

In the example shown, the initialization process 900 includes further, periodic reinitialization assessments. That is, within a predetermined period of time (e.g., every 5-10 minutes) a keep alive message may be sent from the contactless optical user identification device 100 to the bootstrap server, providing the identification of that device 100, as well as optional current configuration information. The bootstrap server 22 may then be configured to provide an indication as to whether any updates are available. If updates are available, in some embodiments, a key exchange process is performed in which the bootstrap server 22 may provide a decryption key (e.g., a public key of a public-private key pair, or a symmetric key) to the device 100. Optionally, the device 100 may also provide a public key of a device-specific public-private key pair to the bootstrap server 22.

The bootstrap server may then provide any updates back to the contactless optical user identification device 100, where they are stored in memory and reflected in execution of the optical code capture and user identification process described below. This may occur, for example, by encrypting any such updates with one or both of a private key of the bootstrap server, a public key of the contactless optical user identification device 100, or both. Alternatively, a symmetric key may be used, which can be generated from a combination of such keys at both the bootstrap server 22 and the contactless optical user identification device 100.

Figure 21:
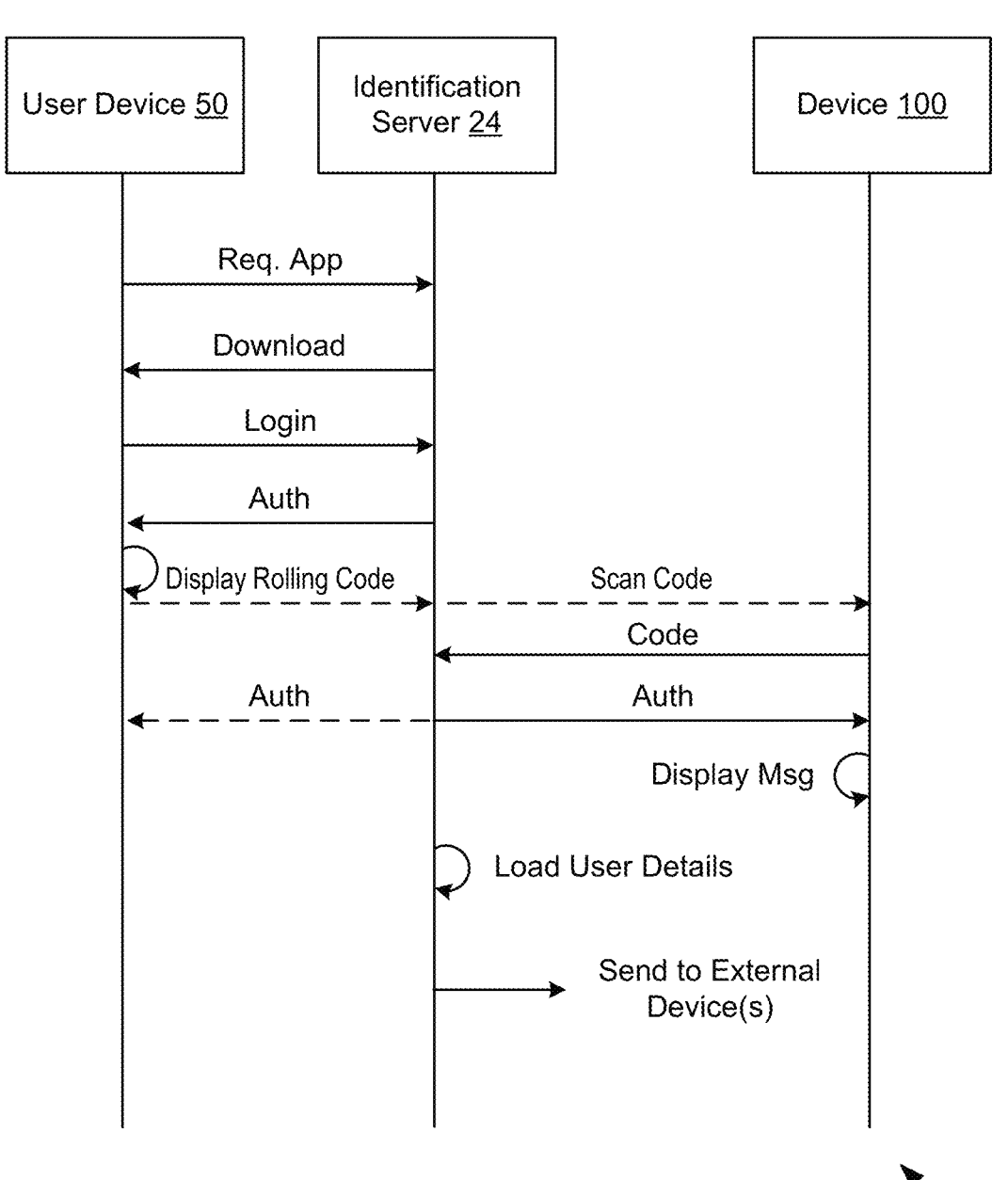
FIG. 21 is a message flow diagram illustrating an example identification and access or presentation process using a contactless optical user identification device, according to an example embodiment.

FIG. 21 is a message flow diagram illustrating an example identification and access or presentation process 1000 using a contactless optical user identification device, according to an example embodiment. In this example, process 1000 is performed among a user's mobile device 50, an identification server 24, and a contactless optical user identification device 100.

As illustrated, a mobile device 50 may request and download an application from the identification server 24, or some other enterprise server. The application may be configured to generate and present an optical code or label that may then be captured by the contactless optical user identification device 100. The optical code or label can be, as shown, a rolling optical code that is periodically synchronized between the user device 50 and identification server 24 (e.g., using a synchronization sequence known in the art, and described generally above in conjunction with the table 700 of FIG. 18). When presented at the device 100, the device 100 may then capture an image of the code and translate that optical code to a binary code, which may be encrypted (e.g., using asymmetric or symmetric keys exchanged between the device 100 and identification server 24, in a manner analogous to the key exchange between bootstrap server 22 and device 100 described above in conjunction with FIG. 20) and transmitted to the identification server 24. Based on a comparison of the binary code with the code synchronized with the user's mobile device 50, the identification server 24 may respond to the device 100 with an authorization message indicating success or failure of the user identification. The identification server may optionally also send a result message directly to the user's mobile device 50.

In the example shown, the contactless optical user identification device 100 can display a message to the user indicating, (e.g., a result of the identification process), one or more instructions to the user as to steps that may be taken based on successful identification (e.g., accessing a restricted area, proceeding to a waiting or service area, etc.).

Additionally, in the example shown, the identification server may load user details regarding the identified user. The user details may include the username, account information, visit history, or other user details. Optionally, the user details may include a previously identified, or predicted, reason for a user to visit the enterprise location. Upon loading the user details, the identification server 24 may communicate with one or more external servers or devices. The communication from the identification server may include one or more messages about the user, including some or all of the user details described above. This information can be presented to another user, for example purposes of assisting the user. Additionally, or in the alternative, the communication may include one or more messages indicating to provide access to restricted areas for the user, for example by communicating authorization messages to an access control system.

Figure 22:
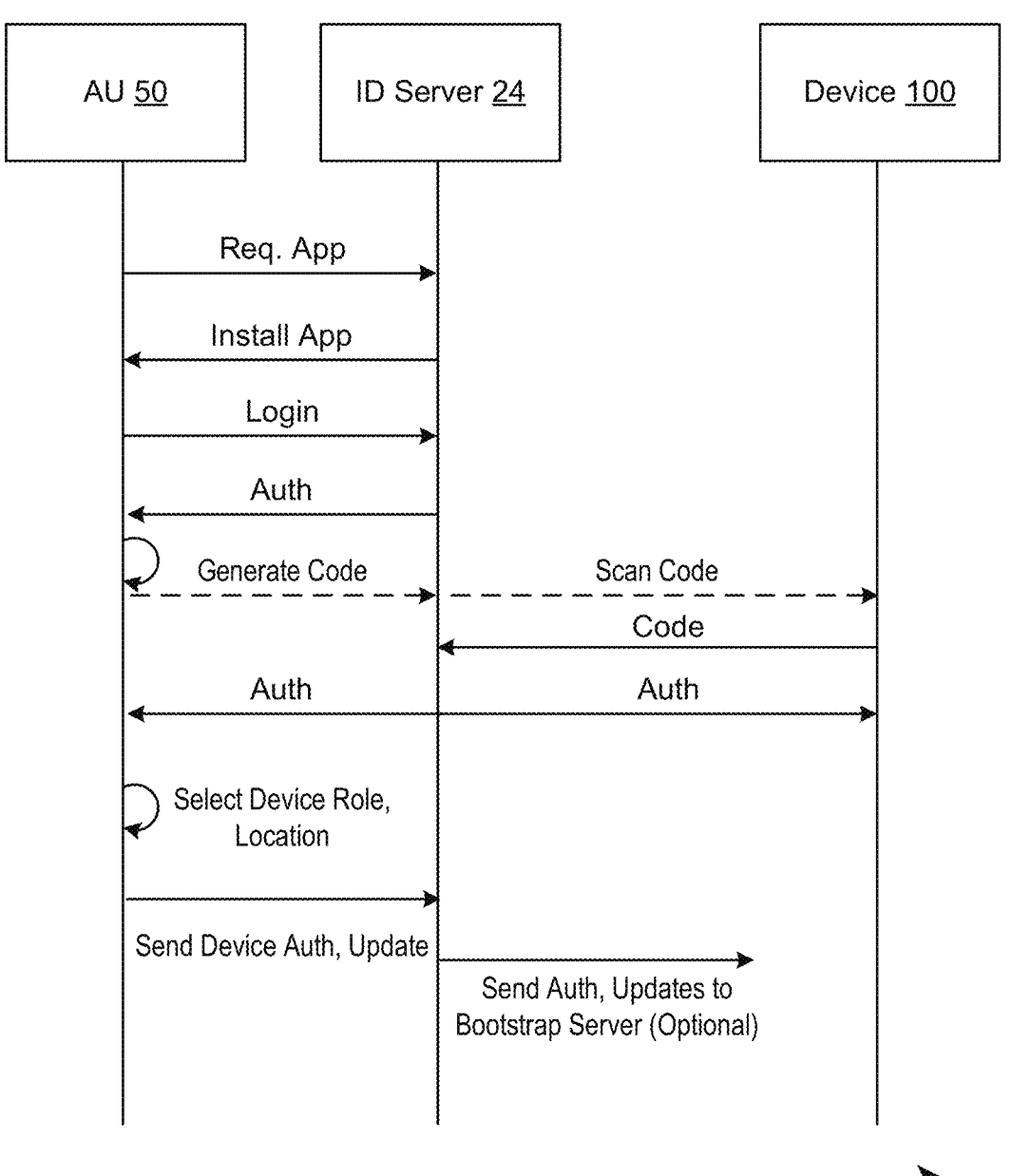
FIG. 22 is a message flow diagram illustrating an example device identification process for use by a contactless optical user identification device.

FIG. 22 is a message flow diagram illustrating an example device identification process 1100 for use by a contactless optical user identification device. In this example, a mobile device 50 of an administrative user AU is shown, in communication with an identification server 24 and a contactless optical user identification device 100. Specifically, the device identification process 1100 allows the administrative user to identify and define a role for a device, for example when first installing device within an enterprise network 30.

In the example shown, the administrative user will, at his or her device 50, submit a request for a mobile application, and receive a mobile application for installation at the mobile device 50 from an enterprise server, such as the identification server 24. The administrative user will, at the mobile device 50, login to the application, and receive an authentication by the identification server providing administrative access within the application.

In the example shown, the mobile device 50 will generate a code, in an analogous manner to that described above in conjunction with FIG. 21. The code will be synchronized with the identification server 24. When the code is presented by the mobile device at the contactless optical user identification device 100, the device 100 will translate the optical code into a binary code, and transmit an encrypted version of the binary code to the identification server 24. Based on the identification server comparing the binary code to the code synchronized between the mobile device 50 and identification server 24, the administrative user will be identified as interacting with device 100. Subsequently, the administrative user AU may, using mobile device 50, select a device role and location for that contactless optical user identification device 100 with which they are interacting. The administrative user may cause the mobile device 50 to transmit device authorization data to the identification server. The device authorization data may include, for example, a device role and location. The identification server may then transmit the device authentication definition and any updates to the bootstrap server 22. Accordingly, during a next instance in which device 100 communicates with the bootstrap server 22 for purposes of checking for updates, the bootstrap server 22 will provide any updates to the role or special-purpose operating instructions designated for the device 100.

Although, in FIGS. 20-22 specific rules are described as being performed by the bootstrap server 22 and identification server 24, it is recognized that servers 22, 24 may be implemented on a same device, or may be implemented using different methods. For example, in FIG. 22, once the administrative user mobile device has been identified and authenticated, the device authorization data may be transmitted directly to a bootstrap server 22 rather than first communicating with identification server 24. In such instances, the application executing on administrative user's mobile device 50 may be installed with instructions capable of communication with both servers 22, 24, or the authorization of the user may provide to the mobile device 50 details regarding connection to the bootstrap server 22. Other connection configurations are possible as well, and would be apparent from the examples described herein. The specific sequence and ordering of messages exchanged among the various devices described herein are, to a great extent, modifiable consistent with the present disclosure.

Now referring to FIG. 23, a schematic example access process 1200 is shown, which is usable in conjunction with a contactless optical user identification device 100. In general, the access process 1200 represents an interaction between a user U1 and a contactless optical user identification device 100 to provide access to a restricted access area (e.g., at the door as shown). In the example shown, the device 100 may display a welcome message 1202, requesting that the user scans an optical code that may be presented within an application on the user mobile device 50. Upon scanning the code, and successful identification of the user using the methods and systems described above, the device 100 may receive a confirmation of identification of the user, and display a confirmation message 1204, confirming successful identification. Optionally, the confirmation message 1204 may include further details, such as to proceed to actuate a door or other access portal controlled by an access control system. In such an example, the contactless optical user identification device 100 acts as an access device.

FIG. 24 is a schematic example user data presentation process 1300 usable in conjunction with a contactless optical user identification device as described herein. In this example, the user U1 may present an optical code using his or her mobile device 52 a contactless optical user identification device 100. Based on identification of user U1 via enterprise server systems 20 (e.g. the bootstrap server 22 and identification server 24 described above), and administrative user may be presented with one or more screens displayable on a display of a computing system 1302. The screens may include, for example, a queue screen 1304 and a current user screen 1306. The queue screen 1304 may present to the administrative user AU a list of users who have identified themselves using a device 100 at a predetermined location, for example such that the administrative user may assist those users in an order of arrival. Based on the administrative user selecting one of the users, a current user screen 1306 may present the user identification, as well as various other user data such as name, address, and likely reason for visit.

Referring to FIGS. 1-24 overall, use of the contactless optical user identification device 100 has a number of advantages when implemented within an enterprise environment, particularly an enterprise environment that may have a plurality of different locations, different access rights for different users, and various other needs in terms of identification of customer users. Specifically, the contactless optical user identification device 100 is able to be quickly configured for an appropriate use by an administrative user at a particular location within the enterprise, and securely maintains user data by limiting the extent of transmission to secure transmission of user codes and user information within the enterprise network. Furthermore, devices may not be removable from the enterprise network without losing not only all user data, but also all instructions necessary to perform the special purpose identification and presentation tasks that are designated for that device. Additional advantages are also realized, in accordance with the description of the systems and methods described herein.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of user identification and access and/or presentation of user data in response to identification of that user, the present disclosure is not so limited.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A contactless optical user identification device comprising:

an optical code capture device comprising an optical image capture device and an optical code translation circuit, the optical code translation circuit configured to recognize and translate a machine-readable optical label captured in an image by the optical image capture device into a binary code;

a wired network access interface communicatively connected to a control circuit and providing both a wired network access connection and power connection for the contactless optical user identification device;

a control circuit communicatively connected to the optical code capture device, the control circuit comprising:
one or more processors; and
a memory comprising:
a non-volatile memory storing a general purpose operating environment and bootstrap instructions, the bootstrap instructions, when executed by the one or more processors, initialize the device, wherein to initialize the device includes to:
establish communication with a bootstrap server identified in the bootstrap instructions;
transmit an identifier of the contactless optical user identification device identified in the bootstrap instructions to the bootstrap server; and
receive, from the bootstrap server, special-purpose operating instructions, wherein the bootstrap server validates the identifier and selects the special-purpose operating instructions based at least in part on a role assigned to the contactless optical user identification device, wherein the role is determined, based at least in part, on the identifier;
a volatile memory configured to receive the special-purpose operating instructions, the special-purpose operating instructions causing the device to:

in response to capture of an image of the machine-readable optical label presented by a user and translation of the machine-readable optical label into a binary code:

securely transmit the translated binary code to an identification server; and receive, in response to the translated binary code, an indication of a result of identification of the user from the identification server;

wherein the memory is configured such that, when power is not supplied to the memory, the bootstrap instructions persist in the memory and the special-purpose operating instructions do not persist in the memory.

2. The contactless optical user identification device of claim 1, wherein the non-volatile memory lacks special-purpose operating instructions allowing the contactless optical user identification device to authenticate a user in response to capture of an image of an optical label.

3. The contactless optical user identification device of claim 1, wherein the identification server is identified in the special-purpose operating instructions.

4. The contactless optical user identification device of claim 1, wherein the one or more processors and the identification server do not receive the image of the machine-readable optical label.

5. The contactless optical user identification device of claim 1, wherein the bootstrap server is accessible only from within an enterprise network.

6. The contactless optical user identification device of claim 1, wherein the special-purpose operating instructions cause the contactless optical user identification device to:

at a predetermined time, transmit a message to the identification server;

in response to the message, receive one or more updates to the special-purpose operating instructions.

7. The contactless optical user identification device of claim 1, wherein the device does not persist any association between a translated binary code and a result of identification of the user in non-volatile memory.

8. The contactless optical user identification device of claim 1, wherein the optical code capture device communicates the translated binary code to the control circuit without retaining or communicating the image of the machine-readable optical label.

9. A method comprising:

in response to execution of a bootstrap instruction from nonvolatile memory, initializing a contactless optical user identification device, wherein the initializing includes:

establishing communication with a bootstrap server identified by the bootstrap instructions;

transmitting a unique identifier of the contactless optical user identification device to the bootstrap server;

downloading special-purpose operating instructions from the bootstrap server identified by the bootstrap instruction into volatile memory of the contactless optical user identification device, the bootstrap server being positioned within an enterprise network, the bootstrap server providing the special-purpose operating instructions after validating the unique identifier of the contactless optical user identification device and selecting the special-purpose operating instructions based at least in part on a role assigned to the contactless optical user identification device, wherein the role is determined, based at least in part, on the unique identifier;

in response to execution of the special-purpose operating instructions:

capturing, at the contactless optical user identification device, an image of a machine-readable optical label presented by a user;

translating the image of the machine-readable optical label into a translated binary code;

securely transmitting the translated binary code from the contactless optical user identification to an identification server via the enterprise network, the special-purpose operating instructions identifying the identification server; and based on a response from the identification server, providing feedback to the user regarding a result of identification of the translated binary code;

ceasing providing power to the memory, wherein responsive to the power not being supplied, the special-purpose operating instructions cease to persist in the volatile memory and the bootstrap instructions persist in non-the volatile memory.

10. The method of claim 9, wherein execution of the bootstrap instruction is performed upon power up of the contactless optical user identification device.

11. The method of claim 9, wherein providing feedback to the user includes presenting on a display of the contactless optical user identification device, a message personalized to the user.

12. The method of claim 11, wherein the message personalized to the user includes instructions for access to a location within the enterprise.

13. The method of claim 9, further comprising, prior to downloading the special- purpose operating instructions, validating that the contactless optical user identification device is connected to the bootstrap server via a wired network connection within the enterprise network.

14. The method of claim 9, wherein the machine-readable optical label is periodically refreshed on a display of a mobile device associated with the user, the machine-readable optical label representing a rolling passcode associated with the user at the identification server and synchronized to the mobile device via a mobile application downloaded to the mobile device.

15. The method of claim 9, further comprising, based on the response from the identification server, authorizing access to a location within the enterprise.

16. An access management system comprising:

one or more enterprise servers;

a contactless optical user identification device communicatively coupled to the one or more enterprise servers via an enterprise network, the contactless optical user identification device being installed at an access portal within an enterprise, the contactless optical user identification device comprising:

an optical code capture device comprising an optical image capture device and an optical code translation circuit, the optical code translation circuit configured to recognize and translate a machine-readable optical label captured in an image by the optical image capture device into a binary code;

a wired network access interface communicatively connected to the control circuit and providing a wired network access connection to the one or more enterprise servers;

a control circuit communicatively connected to the optical code capture device, the control circuit comprising:

one or more processors; and a memory comprising:

a non-volatile memory storing a general purpose operating environment and first instructions, the first instructions configured to initialize the contactless optical user identification device, when executed by the one or more processors, by causing the contactless optical user identification device to: establish communication with a server, transmit an identifier of the contactless optical user identification device identified in the first instructions to the server; and receive, from the server, second instructions, wherein the server validates the identifier and selects the second instructions based at least in part on a role assigned to the contactless optical user identification device, wherein the role is determined based at least in part on the identifier;

a volatile memory configured to receive the second instructions, the second instructions causing the contactless optical user identification device to:

in response to capture of an image of the machine-readable optical label presented by a user and translation of the machine-readable optical label into a binary code, securely transmit the translated binary code to an identification server;

wherein the one or more enterprise servers communicates a result of identification of the user based on the translated binary code to authorize access by the user at the access portal;

wherein the memory is configured such that, when power is not supplied to the memory, the first instructions persist in the memory and the second instructions do not persist in the memory.

17. The access management system of claim 16, wherein the wired network access interface provides a power connection for the contactless optical user identification device.

18. The access management system of claim 16, wherein the access portal comprises an access door to an equipment storage location at an enterprise location.

19. The access management system of claim 16, wherein the one or more enterprise servers comprises the server and the identification server.

* * * * *